United States Patent
Chen et al.

(10) Patent No.: US 11,581,999 B2
(45) Date of Patent: Feb. 14, 2023

(54) REFERENCE SIGNAL DESIGN FOR WIRELESS COMMUNICATIONS

(71) Applicant: QUALCOMM Incorporated, San Diego, CA (US)

(72) Inventors: Wanshi Chen, San Diego, CA (US); Michael Mao Wang, San Diego, CA (US); Hao Xu, San Diego, CA (US); Yongbin Wei, La Jolla, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 448 days.

(21) Appl. No.: 14/876,678

(22) Filed: Oct. 6, 2015

(65) Prior Publication Data

US 2016/0105264 A1    Apr. 14, 2016

Related U.S. Application Data

(60) Provisional application No. 62/061,634, filed on Oct. 8, 2014.

(51) Int. Cl.
*H04L 5/00*  (2006.01)
*H04W 4/70*  (2018.01)
*H04W 72/00*  (2009.01)

(52) U.S. Cl.
CPC .......... *H04L 5/0048* (2013.01); *H04L 5/0053* (2013.01); *H04W 4/70* (2018.02); *H04W 72/005* (2013.01)

(58) Field of Classification Search
None
See application file for complete search history.

(56) References Cited

U.S. PATENT DOCUMENTS

| | | | |
|---|---|---|---|
| 9,893,853 B2 * | 2/2018 | Yi | H04L 1/08 |
| 2011/0111781 A1 * | 5/2011 | Chen | H04B 7/02 |
| | | | 455/507 |

(Continued)

FOREIGN PATENT DOCUMENTS

| | | |
|---|---|---|
| CN | 103238285 A | 8/2013 |
| CN | 103748822 A | 4/2014 |

(Continued)

OTHER PUBLICATIONS

Alcatel-Lucent et al., "Coverage Enhancement Mode Operation," 3GPP TSG-RAN WG2 Meeting #85, R2-140728, Prague, Czech Republic, Feb. 10-14, 2014, 2 pgs., 3rd Generation Partnership Project.

(Continued)

*Primary Examiner* — Jeffrey M Rutkowski
*Assistant Examiner* — Ning Li
(74) *Attorney, Agent, or Firm* — Holland & Hart LLP

(57) ABSTRACT

Methods, systems, and devices are described for reference signal design in wireless communications. A base station may select a reference signal density scheme from a set of available density schemes associated with a port count. The reference signal density scheme may also be selected based on the category of the mobile device receiving the reference signal transmissions. The reference signal density scheme may be a higher density reference signal density scheme or a lower density reference signal density scheme, where the higher density reference signal density scheme includes more reference signal resource elements per subframe. The mobile device may determine the reference signal density scheme based on characteristics of a channel. The higher density reference signal density scheme may provide additional channel estimation opportunities for the mobile device. In some cases, the mobile device sends the channel (Continued)

estimated based on the received reference signals to the base station.

18 Claims, 16 Drawing Sheets

(56) References Cited

U.S. PATENT DOCUMENTS

| | | | | |
|---|---|---|---|---|
| 2012/0087332 | A1* | 4/2012 | Kim | H04B 7/063 370/329 |
| 2012/0314667 | A1* | 12/2012 | Taoka | H04L 1/1896 370/329 |
| 2013/0155974 | A1* | 6/2013 | Papasakellariou | H04W 72/042 370/329 |
| 2013/0201840 | A1 | 8/2013 | Sorrentino et al. | |
| 2013/0201920 | A1* | 8/2013 | Takano | H04W 88/16 370/328 |
| 2013/0308572 | A1* | 11/2013 | Sayana | H04W 28/06 370/329 |
| 2014/0044054 | A1* | 2/2014 | Kim | H04B 7/024 370/329 |
| 2014/0044104 | A1 | 2/2014 | Kim et al. | |
| 2014/0086085 | A1* | 3/2014 | Zheng | H04L 5/0048 370/252 |
| 2014/0169500 | A1* | 6/2014 | Dimou | H04L 1/0014 375/316 |
| 2014/0233457 | A1* | 8/2014 | Koutsimanis | H04L 5/0073 370/328 |
| 2014/0286243 | A1* | 9/2014 | Yamada | H04W 76/025 370/329 |
| 2014/0307577 | A1* | 10/2014 | Benjebbour | H04W 52/243 370/252 |
| 2015/0085717 | A1* | 3/2015 | Papasakellariou | H04L 5/14 370/280 |
| 2015/0146633 | A1* | 5/2015 | Kalhan | H04L 1/1607 370/329 |
| 2015/0223208 | A1* | 8/2015 | Park | H04L 5/001 370/329 |
| 2015/0230211 | A1* | 8/2015 | You | H04W 72/04 370/330 |
| 2015/0230249 | A1* | 8/2015 | Nguyen | H04W 72/042 370/329 |
| 2015/0245323 | A1* | 8/2015 | You | H04W 72/042 370/329 |
| 2015/0257173 | A1* | 9/2015 | You | H04B 17/318 370/330 |
| 2015/0296518 | A1* | 10/2015 | Yi | H04L 1/08 370/336 |
| 2015/0304080 | A1* | 10/2015 | Yi | H04W 72/044 370/329 |
| 2015/0312771 | A1* | 10/2015 | Li | H04W 24/02 455/446 |
| 2015/0318968 | A1* | 11/2015 | Kim | H04B 7/2656 370/329 |
| 2015/0373694 | A1* | 12/2015 | You | H04L 5/0051 370/329 |
| 2016/0056977 | A1* | 2/2016 | Wang | H04W 72/1289 370/336 |
| 2016/0088651 | A1* | 3/2016 | Yu | H04L 5/0053 370/329 |
| 2016/0211960 | A1* | 7/2016 | Wang | H04L 25/0224 |
| 2016/0212636 | A1* | 7/2016 | Dimou | H04W 48/10 |
| 2016/0241308 | A1* | 8/2016 | Kim | H04L 5/0048 |
| 2016/0249350 | A1* | 8/2016 | Koutsimanis | H04W 72/0446 |
| 2017/0223686 | A1* | 8/2017 | You | H04W 72/042 |
| 2017/0223725 | A1* | 8/2017 | Xiong | H04W 72/042 |
| 2017/0311355 | A1* | 10/2017 | Yi | H04L 27/2602 |

FOREIGN PATENT DOCUMENTS

| | | | | |
|---|---|---|---|---|
| JP | 2012124603 | A | 6/2012 | |
| JP | 2016507962 | A | 3/2016 | |
| JP | 2016519484 | A | 6/2016 | |
| KR | WO 2014/088185 | A1 * | 8/2013 | ............... H04B 7/26 |
| SE | WO 2014126519 | A1 * | 8/2014 | ........... H04L 5/0048 |
| WO | WO-2014069944 | A1 | 5/2014 | |
| WO | WO-2014069945 | A1 | 5/2014 | |
| WO | WO-2014088185 | A1 | 6/2014 | |
| WO | WO-2014109566 | A1 | 7/2014 | |
| WO | WO-2014126519 | A1 | 8/2014 | |
| WO | WO-2014153777 | A1 | 10/2014 | |

OTHER PUBLICATIONS

ISA/EPO, International Search Report and Written Opinion of the International Searching Authority, Int'l. App. No. PCT/US2015/054485, dated Jan. 20, 2016, European Patent Office, Rijswijk, NL, 13 pgs.

LG Electronics, "Initial Procedure and Consideration Points for the Coverage Enhancement of MTC UEs," 3GPP TSG RAN WG1 #74, R1-133370, Barcelona, Spain, Aug. 19-23, 2013, 6 pgs., XP_50716484A, 3rd Generation Partnership Project.

3GPP TS 36.211 V11.1.0 (Dec. 2012), "3rd Generation Partnership Project: Technical Specification Group Radio Access Network; Evolved Universal Terrestrial Radio Access (E-UTRA); Physical Channels and Modulation (Release 11)", Dec. 2012, pp. 52-54.

* cited by examiner

| Tone Index | Symbol Index | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | 0 | | | | 0 | | | 0 | | | | 0 | | |
| 1 | | | | | | | | | | | | | | |
| 2 | | | | | | | | | | | | | | |
| 3 | 0 | | | | 0 | | | 0 | | | | 0 | | |
| 4 | | | | | | | | | | | | | | |
| 5 | | | | | | | | | | | | | | |
| 6 | 0 | | | | 0 | | | 0 | | | | 0 | | |
| 7 | | | | | | | | | | | | | | |
| 8 | | | | | | | | | | | | | | |
| 9 | 0 | | | | 0 | | | 0 | | | | 0 | | |
| 10 | | | | | | | | | | | | | | |
| 11 | | | | | | | | | | | | | | |

FIG. 3A

| Tone Index | Symbol Index | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | 0 | | | | 0 | | | 0 | 0 | | | 0 | | |
| 1 | | | | | | | | | | | | | | |
| 2 | | | | | | | | | | | | | | |
| 3 | 0 | | | | 0 | | | 0 | 0 | | | 0 | | |
| 4 | | | | | | | | | | | | | | |
| 5 | | | | | | | | | | | | | | |
| 6 | 0 | | | | 0 | | | 0 | 0 | | | 0 | | |
| 7 | | | | | | | | | | | | | | |
| 8 | | | | | | | | | | | | | | |
| 9 | 0 | | | | 0 | | | 0 | 0 | | | 0 | | |
| 10 | | | | | | | | | | | | | | |
| 11 | | | | | | | | | | | | | | |

FIG. 3B 300-c

| Tone Index | Symbol Index | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | 0 | | | | 1 | | | 0 | | | | 1 | | |
| 1 | | | | | | | | | | | | | | |
| 2 | | | | | | | | | | | | | | |
| 3 | 1 | | | | 0 | | | 1 | | | | 0 | | |
| 4 | | | | | | | | | | | | | | |
| 5 | | | | | | | | | | | | | | |
| 6 | 0 | | | | 1 | | | 0 | | | | 1 | | |
| 7 | | | | | | | | | | | | | | |
| 8 | | | | | | | | | | | | | | |
| 9 | 1 | | | | 0 | | | 1 | | | | 0 | | |
| 10 | | | | | | | | | | | | | | |
| 11 | | | | | | | | | | | | | | |

FIG. 3C 300-d

| Tone Index | Symbol Index | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | 0 | | | | 1 | | | 0 | 1 | | | 1 | | |
| 1 | | | | | | | | | | | | | | |
| 2 | | | | | | | | | | | | | | |
| 3 | 1 | | | | 0 | | | 1 | 0 | | | 0 | | |
| 4 | | | | | | | | | | | | | | |
| 5 | | | | | | | | | | | | | | |
| 6 | 0 | | | | 1 | | | 0 | 1 | | | 1 | | |
| 7 | | | | | | | | | | | | | | |
| 8 | | | | | | | | | | | | | | |
| 9 | 1 | | | | 0 | | | 1 | 0 | | | 0 | | |
| 10 | | | | | | | | | | | | | | |
| 11 | | | | | | | | | | | | | | |

FIG. 3D 300-e

| Tone Index | Symbol Index | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | 0 | 2 | | | 1 | | | 0 | 3 | | | 1 | | |
| 1 | | | | | | | | | | | | | | |
| 2 | | | | | | | | | | | | | | |
| 3 | 1 | 3 | | | 0 | | | 1 | 2 | | | 0 | | |
| 4 | | | | | | | | | | | | | | |
| 5 | | | | | | | | | | | | | | |
| 6 | 0 | 2 | | | 1 | | | 0 | 3 | | | 1 | | |
| 7 | | | | | | | | | | | | | | |
| 8 | | | | | | | | | | | | | | |
| 9 | 1 | 3 | | | 0 | | | 1 | 2 | | | 0 | | |
| 10 | | | | | | | | | | | | | | |
| 11 | | | | | | | | | | | | | | |

FIG. 3E

REFERENCE SIGNAL DESIGN FOR WIRELESS COMMUNICATIONS

CROSS REFERENCES

The present Application for Patent claims priority to U.S. Provisional Patent Application No. 62/061,634 by Chen et al., entitled "Reference Signal Design for Wireless Communications," filed Oct. 8, 2014, assigned to the assignee hereof, and expressly incorporated by reference herein in its entirety.

BACKGROUND

Field of the Disclosure

The present disclosure relates to reference signal design for wireless communications and, more particularly, for enhanced machine-type communications in Long Term Evolution wireless communications.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UE). A base station may communicate with UEs on downlink channels (e.g., for transmissions from a base station to a UE) and uplink channels (e.g., for transmissions from a UE to a base station).

The UEs may be of different categories, including categories that have limited or reduced capabilities with respect to other categories, such as being configured to use reduced communication resources compared to other categories. UEs may also operate in restricted environments, such as basements, equipment closets, and the like. And UEs may be limited by certain narrow bandwidth operations. Machine-type communication (MTC) devices, for example, may be affected by these considerations. Certain coverage enhancement (CE) techniques may, however, provide more operating flexibility for UEs, such as MTC devices.

SUMMARY

The described features generally relate to one or more improved systems, methods, and/or apparatuses for reference signal design in wireless communications. Generally, the reference signal (RS) design may provide a more dense RS scheme, e.g., additional reference signals (RSs) for UEs of a certain type to permit additional channel estimation feedback opportunities. In some examples, a base station may determine that it is communicating with a type of UE or a UE operating in a category with reduced communication capabilities, as compared with other types of UEs or other categories. The base station may also determine the number of antenna ports available to the base station to send the RSs to the UE. The base station may then select and send RSs to the UE according to an RS density scheme that provides sufficient opportunities for the UE to measure channel conditions, and provide channel estimation feedback, to ensure coverage requirements are satisfied. The base station may receive the channel estimation feedback from the UE and, based on the channel conditions, take appropriate steps to provide the necessary coverage. In some examples, the base station may signal to the UE an indication of the RS density scheme being utilized. In some examples, the base station may receive a message from the UE including information indicating a request for enhanced coverage, for a particular transmission mode, etc., that may benefit from a more dense RS density scheme than a commonly utilized RS density scheme, or otherwise less dense RS density scheme and, therefore, configure additional RSs to be utilized.

In an example, a method for wireless communication is described. The method may include selecting a reference signal (RS) density scheme from a set of RS density schemes and transmitting a reference signal to the mobile device according to the selected RS density scheme.

In an example, an apparatus for wireless communication is described. The apparatus may include a processor, memory in electronic communication with the processor, and instructions stored in the memory. The instructions may be executable by the processor to select a reference signal (RS) density scheme from a set of RS density schemes and transmit a reference signal to the mobile device according to the selected RS density scheme.

In an example, an apparatus for wireless communication is described. The apparatus may include means for selecting a reference signal (RS) density scheme from a set of RS density schemes and means for transmitting a reference signal to the mobile device according to the selected RS density scheme.

In an example, a non-transitory computer-readable medium storing computer-executable code for wireless communication is described. The code may be executable by a processor to select a reference signal (RS) density scheme from a set of RS density schemes and transmit a reference signal to the mobile device according to the determined RS density scheme.

Some examples of the method, apparatuses, or non-transitory computer-readable medium may include processes, features, means, or instructions for identifying a mobile device category or a mobile device capability. Some examples of the method, apparatuses, or non-transitory computer-readable medium may include processes, features, means, or instructions for identifying one or more parameters associated with a channel, which in some examples may include port count of a mobile device. Some examples of the method, apparatuses, or non-transitory computer-readable medium may include processes, features, means, or instructions for selecting the RS density scheme from the set of RS density schemes based at least in part on the identified category of the mobile device, the identified capability of the mobile device, the one or more parameters associated with the channel, or any combination thereof.

Some examples of the method, apparatuses, or non-transitory computer-readable medium may include processes, features, means, or instructions for receiving a channel quality indication from the mobile device, the channel quality indication based at least in part on the transmitted reference signal. Transmitting the reference signal may include processes, features, means, or instructions for transmitting at least one of a cell-specific reference signal (CRS) or a demodulation reference signal (DM-RS) or a combination thereof to the mobile device. Some examples of the method, apparatuses, or non-transitory computer-readable medium may include processes, features, means, or instructions for identifying a coverage enhancement for the mobile device, and selecting the RS density scheme based at least in part on the identified coverage enhancement.

Some examples of the method, apparatuses, or non-transitory computer-readable medium may include processes, features, means, or instructions for identifying a transmission mode for the mobile device, and selecting the RS density scheme based at least in part on the identified transmission mode. The transmission mode may include a broadcast mode or a unicast mode, and the transmission may use a broadcast channel or a unicast channel. In some examples of the method, apparatuses, or non-transitory computer-readable medium, the transmission may use a control channel or a data channel, which may be a physical downlink control channel (PDCCH) or a physical downlink shared channel (PDSCH). Some examples of the method, apparatuses, or non-transitory computer-readable medium may include processes, features, means, or instructions for increasing a number of reference signals transmitted to the mobile device according to the RS density scheme based on the identified category of the mobile device. The set of RS density schemes may include a lower density RS density scheme and a higher density RS density scheme. The mobile device category or mobile device capability may include at least one of a machine-type communication (MTC) device, a narrowband MTC device, a user equipment (UE) operating in a narrowband, a UE supporting multiple RS density schemes, or combinations thereof. The category of mobile device may be Category 0. In some examples a mobile device capability may refer to a capability of operating in a mobile device category during a first time period, which may not be the same mobile device category as a second time period. Therefore in some examples mobile device capability may refer to an ability to be selectively configured to operate in a category based on various parameters.

Some examples of the method, apparatuses, or non-transitory computer-readable medium may include processes, features, means, or instructions for transmitting a message to the mobile device, the message comprising an indication of the RS density scheme. The message may include an indication of whether a cell-specific reference signal (CRS) or demodulation reference signal (DM-RS) or a combination thereof is included in the RS density scheme. In some examples of the method, apparatuses, or non-transitory computer-readable medium, the indication of an RS density scheme may be transmitted in dedicated signaling or broadcast information. The port count may be at least one of one-port or two-ports. The RS density scheme may include twenty (20) resource elements per subframe.

In an example, a method for wireless communication is described. The method may include receiving a reference signal transmitted according to a reference signal (RS) density scheme, the RS density scheme selected from a set of RS density schemes, identifying the RS density scheme based at least in part on a type of channel associated with the reference signal or a coverage enhancement for the channel associated with the reference signal, and communicating using the reference signal according to the identified RS density scheme.

In an example, an apparatus for wireless communication is described. The apparatus may include a processor; memory in electronic communication with the processor; and instructions stored in the memory. The instructions may be executable by the processor to receive a reference signal transmitted according to a reference signal (RS) density scheme, the RS density scheme selected from a set of RS density schemes, identify the RS density scheme based at least in part on a type of channel associated with the reference signal or a coverage enhancement for the channel associated with the reference signal, and communicate using the reference signal according to the identified RS density scheme.

In an example, an apparatus for wireless communication is described. The apparatus may include means for receiving a reference signal transmitted according to a reference signal (RS) density scheme, the RS density scheme selected from a set of RS density schemes, identifying the RS density scheme based at least in part on a type of channel associated with the reference signal or a coverage enhancement for the channel associated with the reference signal, and communicating using the reference signal according to the identified RS density scheme.

In an example, a non-transitory computer-readable medium storing computer-executable code for wireless communication is described. The code may be executable by a processor to receive a reference signal transmitted according to a reference signal (RS) density scheme, the RS density scheme selected from a set of RS density schemes, identify the RS density scheme based at least in part on a type of channel associated with the reference signal or a coverage enhancement for the channel associated with the reference signal, and communicate using the reference signal according to the identified RS density scheme.

Some examples of the method, apparatuses, or non-transitory computer-readable medium may include processes, features, means, or instructions for receiving an indication of an RS density scheme, wherein the RS density scheme is identified based at least in part on the indication, and wherein the indication is received in dedicated signaling or broadcast information. In some examples of the method, apparatuses, or non-transitory computer-readable medium, the receiving the reference signal comprises processes, features, means, or instructions for receiving at least one of a cell-specific reference signal (CRS) or a demodulation reference signal (DM-RS) or a combination thereof.

Some examples of the method, apparatuses, or non-transitory computer-readable medium may include processes, features, means, or instructions for receiving a set of reference signals, which may be an increased number of reference signals, according to the RS density scheme and based at least in part on a mobile device category or a mobile device capability. In some examples of the method, apparatuses, or non-transitory computer-readable medium, the category of the mobile device comprises at least one of a machine-type communication (MTC) device, a narrowband MTC device, a UE operating in a narrowband, a UE supporting multiple RS density schemes, or Category 0 device.

In some examples of the method, apparatuses, or non-transitory computer-readable medium, the RS density scheme is selected from the set of RS density schemes based at least in part on one or more parameters associated with the channel, which in some examples may be associated with a port count of the mobile device.

In some examples of the method, apparatuses, or non-transitory computer-readable medium, the type of channel comprises at least one of a broadcast channel or a unicast channel. In some examples of the method, apparatuses, or non-transitory computer-readable medium, the type of channel comprises at least one of a control channel or a data channel. In some examples, the type of channel may be a physical downlink control channel (PDCCH) or a physical downlink shared channel (PDSCH).

In some examples of the method, apparatuses, or non-transitory computer-readable medium, the coverage enhancement of the channel comprises a repetition of the channel, and the RS density scheme is identified based at least in part on a number of repetitions of the channel. In some examples the RS density scheme is identified for a first number of repetitions and another RS density scheme is identified for a second number of repetitions larger than the first number of repetitions, wherein the other RS density scheme has a higher RS density than the RS density scheme.

In some examples of the method, apparatuses, or non-transitory computer-readable medium, the communicating comprises processes, features, means, or instructions for performing at least one of a channel estimation or an interference estimation using the reference signal, and decoding the channel based on the at least one of the channel estimation or the interference estimation. In some examples of the method, apparatuses, or non-transitory computer-readable medium, the RS density scheme comprises twenty (20) resource elements per subframe.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings and Appendix. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 3A through 3E show diagrams illustrating aspects of example reference signal density schemes, in accordance with aspects of the present disclosure;

DETAILED DESCRIPTION

Figure 1:
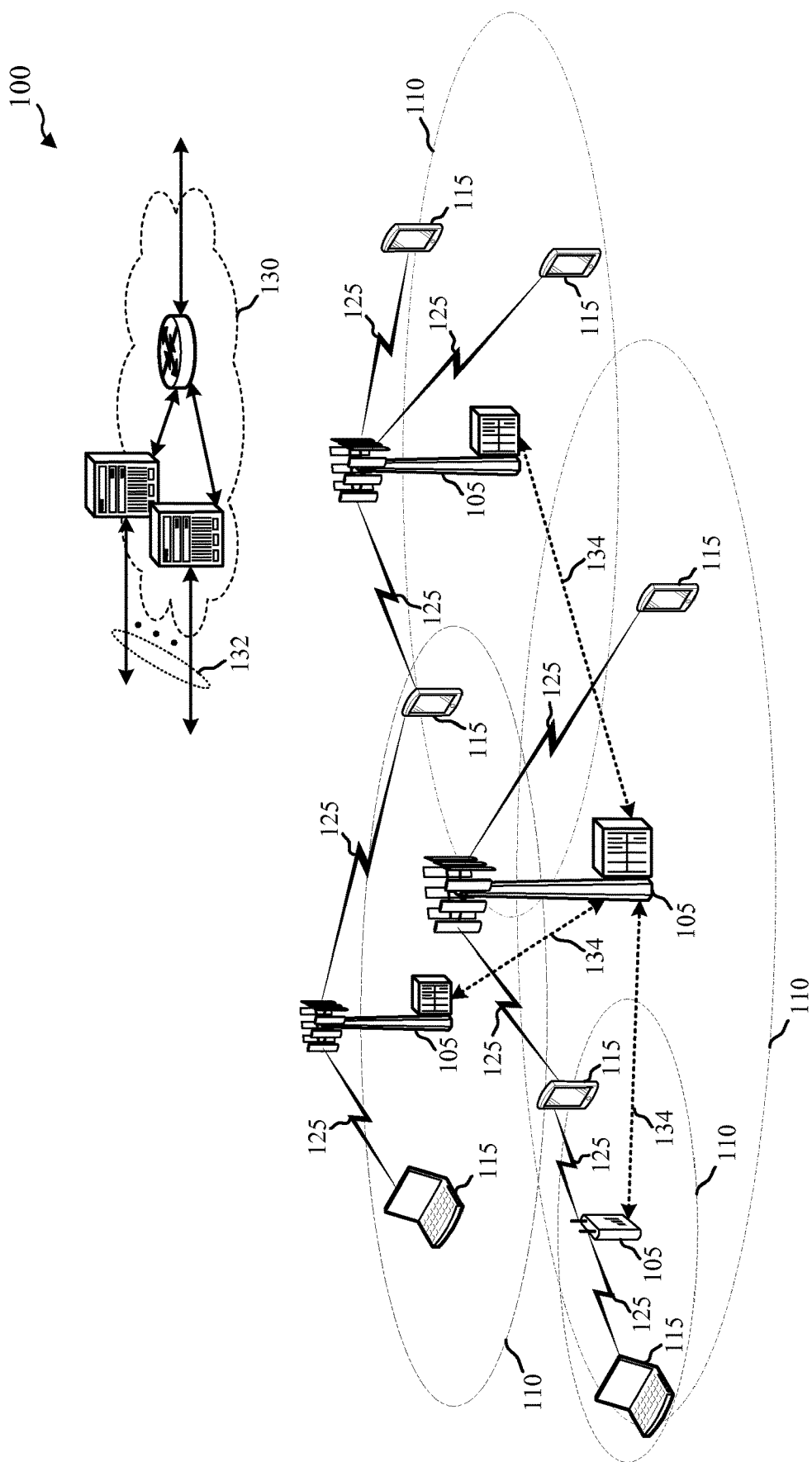
FIG. 1 illustrates an example of a wireless communication system, in accordance with aspects of the present disclosure.

Wireless communication systems may be configured to support the operation of devices in wider system bandwidths, and with coverage enhancements (CEs) for coverage-limited devices. System enhancements may allow devices, which may be designed to operate within a narrow bandwidth, to effectively operate in a wider bandwidth. For instance, system enhancements may allow devices that are configured for operation within a 1.4 MHz bandwidth (e.g., six (6) resource blocks (RBs)) to operate in, for example, 3, 5, 10, 15, or 20 MHz bands. And such enhancement may allow for coverage enhancements on the order of 15 dB.

In some examples one or more devices of a wireless communications system may be a machine-type communication (MTC) device, or may be otherwise operating in an MTC category. For example, a device may be configured to operate as a Category 5 device during a time period, and configured to operate as an MTC device during a different time period. In some cases, a system may utilize a wide band carrier (e.g., 3-20 MHz). Multiple MTC devices may concurrently communicate on control and downlink channels within the wide band. For example, each MTC device may monitor, transmit, or receive with a constraint of six (6) physical RBs (PRB) at any given time; and different MTC devices may be served in different 6-PRB blocks. In other words, multiple MTC devices may communicate over frequency-division multiplexed (FDM) resources of a single transmission time interval (TTI) (e.g., a subframe).

In order to support system enhancements, an MTC control or data channel may be frequency-division multiplexed with control or data channels for other UEs, which may not be MTC devices. These MTC control and data channels may be referred to as an MTC physical downlink control channel (MPDCCH) and an MTC physical downlink shared channel (MPDSCH), respectively. In some examples, MTC devices capable of such FDM operation may be referred to as enhanced or evolved MTC (eMTC) devices.

The MPDCCH and MPDSCH may operate in a consistent, or beneficial manner with enhanced/evolved PDCCH (EPDCCH), which may provide uplink and downlink grants for other UEs. For instance, an MPDCCH or MPDSCH with an EPDCCH may be frequency-division multiplexed in a single TTI. In some examples, an EPDCCH is implemented by reliance on a demodulation reference signal (DM-RS), as opposed to a cell-specific reference signal (CRS), which may allow EPDCCH to be UE-specifically configured. That is, each UE within a cell can be configured to monitor a different set of resources, and thus a different EPDCCH. Enhanced or evolved MTC devices may be similarly configured to monitor MPDCCH or MPDSCH, or both.

In order to support such enhancements, reference signals for control or data channels, or both, may be modified with respect to other systems, such as earlier Long Term Evolution (LTE) systems. These enhancements may provide for reference signals that yield a number of desirable properties for various devices such as MTC devices or eMTC devices. For example, references signals in an enhanced system may provide for both broadcast (e.g., MTC system information) and unicast transmission. They may also support coverage enhancements, including TTI bundling, and non-bundling scenarios. Further, they may support both normal and extended cyclic prefix (CP) implementations. And, in view of the need for backwards compatibility and flexible deployment, they may support both legacy and new carrier types (e.g., LTE in an unlicensed spectrum).

An eMTC device may beneficially operate with knowledge of certain aspects of system enhancements, and reference signal design, which may be conveyed to eMTCs in broadcast information. For example, an eMTC device may determine the number of antenna ports (e.g., CRS ports) utilized by a base station by decoding a physical broadcast channel (PBCH), and, in some examples, by determining a CRS frequency shift. Additionally, an eMTC device may determine system bandwidth (e.g., for a wide band carrier) by decoding the PBCH.

In some examples, a reference signal for eMTC devices may be based on CRS resource elements (REs) in a 6-PRB band assigned to and monitored by, for example, a group of eMTC devices. The reference signal may also be based on DM-RS REs within the assigned PRBs. A DM-RS may be transmitted in all, a subset, or none of the six assigned PRBs, however, depending on the PRB assignment. In some examples the reference signal may be based on a combination of CRS REs and DM-RS REs.

Various RS density schemes utilizing different combinations of CRS and DM-RS REs may be employed to facilitate eMTC operation. For instance, eMTC devices may benefit from a higher density of RS transmissions than a commonly utilized RS density scheme, or otherwise lower density RS density scheme, where the higher density RS density scheme includes a set of CRS and DM-RS REs within a given PRB, which may be an increased number of reference signals, which may provide additional channel condition measurement and feedback opportunities. Additionally or alternatively, higher density RS density schemes may provide for MPDCCH or MPDSCH operation.

According to aspects of the present disclosure, the base station may select an RS density scheme to be used for a certain category of UE, or a UE otherwise operating in a certain category. For instance, a UE may have a mobile device capability which refers to an ability to be selectively configured to operate in a category based on various parameters. The RS density scheme may also be based on one or more parameters associated with the channel. In some examples the RS density scheme may be based on the number of antenna ports being used to transmit the RS to the UE.

The RS density scheme may, for certain UEs or port counts, increase the number of resource elements (REs) utilized to for reference signal transmissions within a PRB and, accordingly, provide additional opportunities for the UE to measure and report the channel conditions. Channel conditions may include, but are not limited to such conditions as signal phase, signal amplitude, signal strength, signal interference, signal distortion, signal-to-noise ratio (SNR), signal-to-interference plus noise ratio (SINR), signal-to-noise plus distortion ratio (SNDR), channel coefficients, and the like. In some aspects, the RS density scheme may be based at least in part on a coverage enhancement (e.g., a 15 dB coverage improvement) for the UE, on a transmission mode (e.g., unicast transmission, broadcast transmission, etc.), and the like, for the UE. In some examples, the added REs (e.g., the increased RS density) may also be power ramped—e.g., certain REs may be transmitted at a power greater than other REs.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with aspects of the present disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up a portion of the coverage area (not shown). The wireless communications system 100 may include base stations 105 of different types (e.g., macro and/or small cell base stations). The base stations 105 may be configured to communicate with one or more communication technologies, where each communication technology may have an associated geographic coverage area 110. The geographic coverage area 110 for a first communication technology may overlap with the geographic coverage area 110 for a second communication technology, and the first and second communication technology may be associated with the same base station 105, or different base stations 105.

In some examples, the wireless communications system 100 is an LTE/LTE-A network. In LTE/LTE-A networks, the term evolved Node B or enhanced Node B (eNB) may be generally used to describe the base stations 105. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be, or may be otherwise operating as a machine-type communication (MTC) device, an enhanced or evolved MTC (eMTC) device, etc., which may include automated meters, sensors, and the like, which may have relatively low throughput applications, etc. A UE may be able to communicate with various types of base stations and network equipment including macro eNBs, small cell eNBs, relay base stations, and the like.

In some examples, UEs 115 are MTC or eMTC devices located in areas that inhibit communications with a base station 105. An MTC may be located in a basement or equipment cabinet, for instance, which may limit the MTC device's ability to effectively receive transmissions from a base station 105. A base station 105 may therefore employ coverage enhancement (CE) techniques to improve, or increase the likelihood of successful communications with the MTC device. Coverage enhancement techniques may include a number of transmission strategies that increase the effective transmit power of a signal.

By way of example, CE techniques may include repeated transmissions, TTI bundling, HARQ retransmission, physical uplink shared channel (PUSCH) hopping, beamforming, power boosting, or other techniques. The CE techniques used may depend on the specific needs of devices in different circumstances. For example, TTI bundling may involve sending multiple copies of the same information in a group of consecutive TTIs rather than waiting for a non-acknowledgement (NACK) before retransmitting redundancy versions. This may be effective for users engaging in VoLTE or voice over IP (VOIP) communications. In other cases, the number of HARQ retransmissions may also be increased. Uplink data transmissions may be transmitted using frequency hopping to achieve frequency diversity. Beamforming may be used to increase the strength of a signal in a particular direction, or the transmission power may simply be increased. In some cases, one or more CE options may be combined and CE levels may be defined based on a number of decibels the techniques are expected to improve a signal (e.g., no CE, 5 dB CE, 10 dB CE, 15 dB CE, etc.). Additionally or alternatively, coverage enhancement techniques may include a selection of a higher density RS density scheme.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplexing (FDD) (e.g., using paired spectrum resources) or time division duplexing (TDD) operation (e.g., using unpaired spectrum resources). Frame structures for FDD (e.g., frame structure type 1) and TDD (e.g., frame structure type 2) may be defined.

In some examples of the wireless communications system 100, base stations 105 or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some examples, a base station 105 may select an RS density scheme from a set of available RS density schemes. In some examples, the selection of an RS density scheme may be based on the number of available antenna ports used to transmit RSs as well as the mobile device category or mobile device capability of UE 115 the RSs are being transmitted to. For some categories or capabilities of UEs 115, the base station may select an increase of the density of RSs being transmitted within a PRB to provide additional channel measurement, interference measurement, and estimation support. For example, a UE 115 may be an eMTC that uses the increased RS density within the PRB to take additional RS measurements to provide more clear and definite feedback information about the condition of the channel. Accordingly, the base station 105 may have more information on which to base transmission characteristic decisions, e.g., modulation and coding scheme (MCS), throughput capability, data rate, transmission power, etc. Accordingly, the base station 105 may adjust the RS density scheme to provide additional channel measurement and reporting opportunities to support UEs 115 associated with, or otherwise operating in a particular category. In some examples, the base station 105 may send a message to the UE 115 indicating the selected RS density scheme. The base station 105 may, for instance, transmit a downlink control information (DCI) element in a control channel, and the DCI may indicate a particular RS density scheme.

Figure 2:
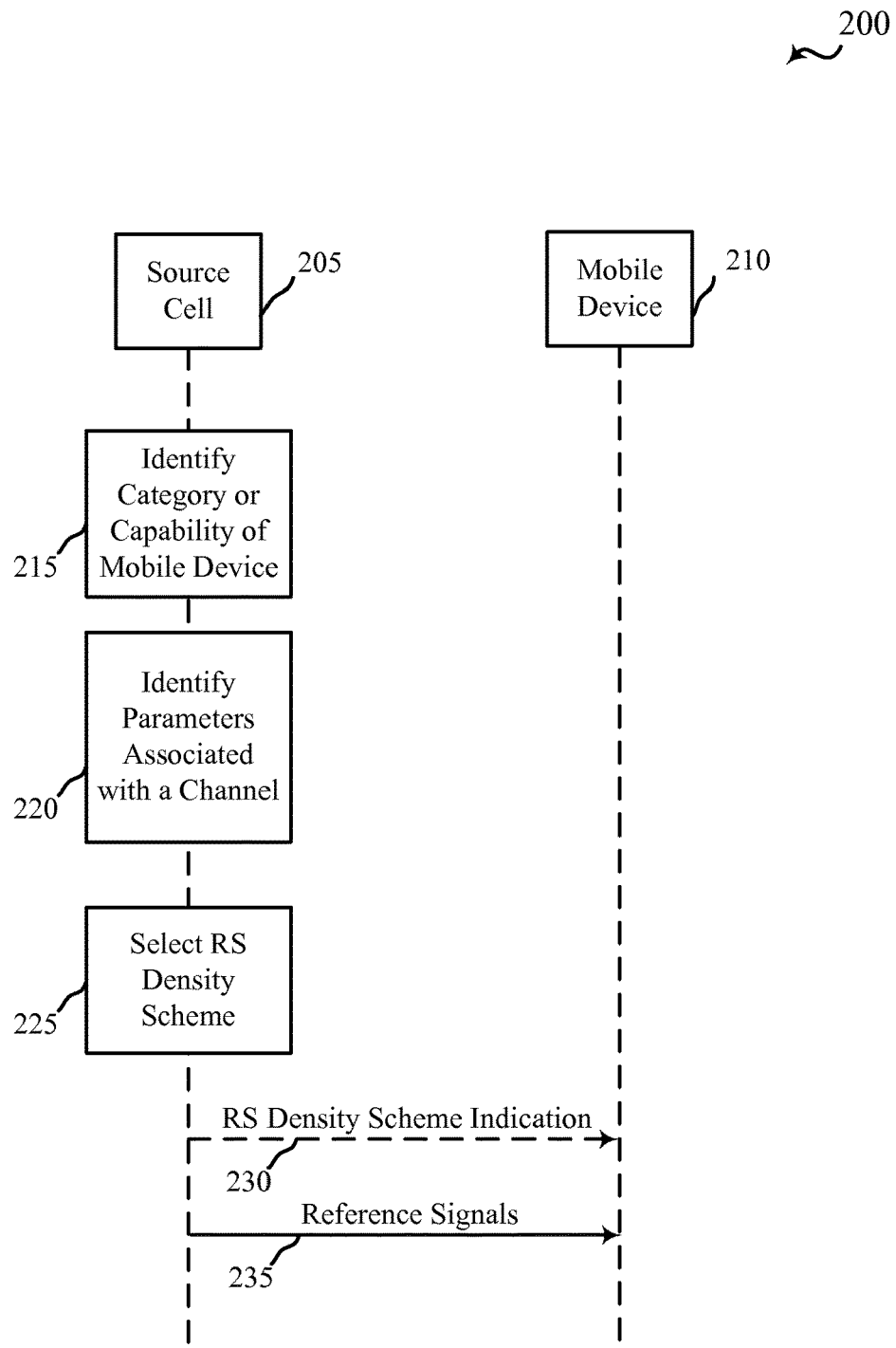
FIG. 2 shows a message flow diagram illustrating aspects of reference signal design in wireless communications, in accordance with aspects of the present disclosure.

FIG. 2 shows a message flow diagram 200 illustrating aspects of reference signal design in wireless communications, in accordance with aspects of the present disclosure. The message flow diagram 200 may illustrate aspects of the wireless communications system 100 described with reference to FIG. 1. The message flow diagram 200 includes a source cell 205 and a mobile device 210. The source cell 205 may be an example of aspects of one or more of the base stations 105 described with reference to FIG. 1. The mobile device 210 may be an example of aspects of one or more of the UEs 115 described with reference to FIG. 1. Generally, the message flow diagram 200 illustrates aspects of implementing reference signal density scheme design in wireless communication systems. In some examples, a system device, such as one of the UEs 115 or base stations 105 described with reference to FIG. 1 may execute a set of codes to control the functional elements of the device to perform some or all of the functions described below.

At block 215, the source cell 205 may identify a mobile device category or a mobile device capability of the mobile device 210. In various examples, the mobile device 210 can be associated with, or be otherwise operating in the identified category. For example, the mobile device 210 may have a mobile device capability that refers to an ability to be selectively configured to operate in a category based on various parameters. In some examples, the mobile device category or mobile device capability may be related to a configuration of the mobile device 210 to use reduced communication resources, e.g., reduced data rate, reduced bandwidth, etc., than otherwise available via the source cell 205. The mobile device 210 may be a low-cost UE, an MTC device, an eMTC device, etc. Additionally or alternatively, the mobile device category or mobile device capability for the mobile device 210 may be associated with a mobile device 210 that may benefit from coverage enhancements, from communication configurations selected to support a particular transmission mode, etc.

At block 220, the source cell 205 may identify one or more parameters associated with a channel. For example, the source cell 205 may identify the number of antenna ports, or simply "ports," available to the source cell 205 for RS transmission on the channel. In various examples the source cell 205 may have one port, two ports, three ports, and so forth, available to transmit an RS to the mobile device 210. The port count may be determined based at least in part on the configuration of the source cell 205, on the available (or free) ports of the source cell 205, and the like. In some examples, the mobile device 210 may be aware of the port count for the source cell 205, e.g., by decoding a physical broadcast channel (PBCH) and an associated RS frequency shift. Additionally or alternatively, the mobile device 210 may be aware of the supported system bandwidth of the source cell 205 by decoding the PBCH.

At block 225, the source cell 205 may select an RS density scheme from a set of RS density schemes available for RS transmissions. In some examples the selection of an RS density scheme may be based at least in part on the parameters associated with the channel, and additionally or alternatively be based at least in part on the mobile device category or mobile device capability of the mobile device 210. In some examples, the selected RS density scheme may provide for additional instances of the RSs (e.g., REs) within a given PRB. The RS(s) transmitted according to the selected RS density scheme may include a cell specific reference signal (CRS), a demodulation reference signal (DM-RS), which may be referred to as a UE-specific reference signal, or combinations thereof.

In some aspects, the selected RS density scheme may support broadcast transmissions, unicast transmissions, or both. For example, an MTC system information block (SIB) may provide an indication of the selected RS density scheme. The selected RS density scheme may support transmission time interval (TTI) bundling as well as non-bundling for TTI. The selected RS density scheme may support standard length CPs as well as extended length CPs. In some examples, the selected RS density scheme may support heterogeneous networks, e.g., LTE systems utilizing licensed or unlicensed spectrum.

At 230, the source cell 205 may optionally send a signal to the mobile device 210 that includes an indication of the selected RS density scheme, which may be transmitted by a dedicated signaling or a broadcast transmission. For example, the source cell 205 may send a DCI element via a control channel to inform the mobile device 210 of the selected RS density scheme. Alternatively, the source cell 205 may not send some or all of the indication of the selected RS density scheme to the mobile device 210. Instead, the mobile device 210 may attempt to monitor REs associated with RS transmissions and, if successful, determine that the RSs are intended for channel measurements or interference measurements, i.e., are RSs according to the selected RS density scheme. As one example, the mobile device 210 may attempt to blindly decode the RSs using a cyclic redundancy check (CRC) and, if the CRC is successful, determine that the RS is intended for channel estimation and measurement according to the selected RS density scheme.

At 235, the source cell 205 may send the RSs to the mobile device 210 according to the selected RS density scheme. In various examples, the source cell 205 may send a CRS, a DM-RS, or combinations thereof, in the resource elements of the PRB/subframe as defined by the RS density scheme.

FIGS. 3A through 3E show diagrams 300-a through 300-e, respectively, illustrating aspects of example RS density schemes, in accordance with aspects of the present disclosure. The diagrams 300 may illustrate aspects of the wireless communications system 100 described with reference to FIG. 1. One or more of the base stations 105 described above with respect to FIG. 1 or 2 may implement aspects of the diagrams 300. For example, the diagrams 300 may collectively illustrate a set of RS density schemes, and any one or more of the RS density schemes may be associated with any one or more of a parameter associated with a channel, which in some examples may be a port count, a mobile device category, or a mobile device capability. A base station 105 may select one of the RS density schemes for RS transmissions to a UE 115. In some examples, a system device, such as one of the UEs 115 or base stations 105 may execute sets of codes to control the functional elements of the device to perform some or all of the functions illustrated with respect to diagrams 300 described with reference to FIGS. 3A through 3E.

The example RS density schemes shown in diagrams 300 are generally represented in a subframe that includes two PRBs, e.g., each PRB includes 12 subcarriers (identified as Tone Index 0-11) and seven symbols (identified as Symbol Index 0-6 and 7-13 for the two PRBs, respectively). Accordingly, each PRB includes 84 resource elements (REs) (12 subcarriers by 7 symbols) and the subframe includes a total of 168 REs available for data or control information transmission. A base station 105 may transmit an RS in a number of REs, depending on a particular RS density scheme, for channel estimation or interference measurements at the UE. As previously discussed, a parameter associated with the channel, such as port count for the base station 105, may be used to determine, at least to some extent, the number or location of REs for RS transmission.

For example, and as illustrated in FIG. 3A, the RS density scheme shown in diagram 300-a may be associated with a one-port RS transmission and may be selected for RS density schemes that are applicable to a UE 115 associated with or otherwise operating in any category. In some examples, the RS density scheme shown in diagram 300-a may be referred to as a lower density RS density scheme. As shown in FIG. 3A, a base station 105 may transmit 16 RSs (8 RS per PRB) via the one-port antenna (identified as antenna port "0") during REs that correspond to Tone Indexes 0, 3, 6, and 9, and Symbol Indexes 0, 4, 7, and 11, respectively. That is, the base station 105 may transmit an RS at Tone Index 0, Symbol Index 0, another RS at Tone Index 3, Symbol Index 0, and so forth, until the 16 RSs are transmitted. In some aspects, the RS density scheme shown in diagram 300-a may be applicable for a UE 115 associated with a mobile device category or a mobile device capability, e.g., an MTC or other device communicating using the full capability of the associated base station 105. Accordingly, the base station 105 may, in some aspects, avoid overhead signaling of the indication of the RS density scheme to UEs 115.

As another example, and as illustrated in FIG. 3B, the RS density scheme shown in diagram 300-b may also be associated with a one-port RS transmission and may be selected for RS density schemes that are advantageous to UEs 115 associated with or otherwise operating in certain categories. The RS density scheme shown in diagram 300-b may be a higher density RS scheme, at least as compared to the lower density RS density scheme shown in diagram 300-a. In some examples, the RS density scheme shown in diagram 300-b may be selected by a base station 105 based on communications with a UE 115 associated with or otherwise operating in a predefined mobile device category or mobile device capability, e.g., a narrowband UE, an MTC device, an eMTC device, and the like. In some aspects, the category of the UE 115 associated with the communication and RS density scheme may correspond to lower functional requirements, e.g., narrowband, low data rate, etc. In other words, the category of UE may indicate to a base station the UEs capabilities with respect to UL and DL communications. Generally, the RS density scheme shown in diagram 300-b includes additional RSs per PRB or subframe as compared with, for example, with the RS density scheme illustrated in FIG. 3A. As shown in FIG. 3B, the base station may transmit four (4) additional instances of the RS (e.g., REs) at Symbol Index 8 and Tone Indexes 0, 3, 6, and 9, for a total of 20 REs (or 20 instances of the RS) per subframe. Accordingly, the UE 115 may have an additional four channel measurement, estimation, and reporting opportunities for the subframe.

In some examples, the RSs transmitted in the lower density RS density scheme of diagram 300-a may be CRS and the extra REs transmitted in the higher density RS density scheme shown in diagram 300-b may be CRS, DM-RS, or combinations thereof. In some examples, the REs may be scheduled for DM-RS transmission where the DM-RS signal can be used for channel estimation, in a manner similar to a CRS transmission. Accordingly, transmission of CRS-type RSs during the DM-RS REs may provide for increased RS design considerations. Additionally or alternatively, the base station 105 may transmit DM-RS during the added REs. The DM-RS REs may be coded with a known precoder, or they may not be precoded. A UE 115 receiving the DM-RS may perform various combining functions to determine the channel estimation, e.g., weighting, averaging, etc. For example, the UE 115 may measure channel conditions using the CRS REs and then perform channel measurement or interference measurement of the DM-RS REs and, based on both measurement set(s), determine an index of the channel conditions for channel estimation or interference estimation reporting.

In some examples, the selection of DM-RS REs to utilize in an RS density scheme may be based on a coverage needs of the UE 115. For example, a UE 115 that does not have a need for enhanced coverage from the base station 105 may be scheduled to receive CRS REs. As another example, the DM-RS REs may be selected for inclusion in the RS density scheme based on the transmission mode of the UE 115, e.g., DM-RS REs may be associated with other DM-RS REs to improve channel estimation or interference estimation reporting. In other examples, the selection of DM-RS REs to be included in the RS density scheme may be the same, or different for a control channel or a data channel, e.g., a physical downlink control channel (PDCCH) and a physical downlink shared channel (PDSCH).

Referring to FIGS. 3C and 3D, shown are example RS density schemes for two-port RS transmission, according to various aspects of the present disclosure. Generally, the RS density scheme shown in diagram 300-c may be a lower density RS density scheme, and may be selected for a UE 115 associated with or otherwise operating in any category, whereas the RS density scheme shown in diagram 300-d, which may be a higher density RS density scheme, may be selected for a UE 115 associated with or otherwise operating in a particular category, e.g., an eMTC device utilizing reduced communication resources. A base station 105 may transmit an RS via the two antenna ports (identified as port "0" and "1") according to the selected RS density scheme. The RS density scheme shown in diagram 300-c may include 16 REs being transmitted within the subframe. In contrast, the RS density scheme shown in diagram 300-d may include four additional REs being transmitted, for a total of twenty RS REs. This provides additional opportunities for UEs 115 operating in a particular category to measure and report channel conditions, which may be used to improve coverage for the UE 115.

In some cases, the higher density RS density schemes shown in diagrams 300-b and 300-d are backwards compatible. For example, the higher density RS density schemes of diagrams 300-b and 300-d include RS being transmitted according to the lower density RS density schemes of diagrams 300-a and 300-c, respectively. Accordingly, a UE 115 that does not support the higher density RS density schemes, for example, may still be able to perform channel estimation or interference estimation procedures based on the known location of the RS. A UE 115 that does support the presently disclosed RS density scheme, however, may be able to use the additional REs of RS density schemes shown in diagrams 300-b and 300-d for added channel measurement, interference measurement, and reporting opportunities.

As another example, and as illustrated in FIG. 3E, four-port RS transmission may be employed, in accordance with various aspects of the present disclosure. In some examples, the RS density scheme shown in diagram 300-e may be selected for a UE 115 associated with or otherwise operating in any category. A base station 105 may transmit 24 instances of an RS in REs associated with Tone Indexes 0, 3, 6, and 9, and Symbol Indexes 0, 1, 4, 7, 8, and 11. The base station 105 may transmit the 24 RSs using the four antenna ports (identified as ports "0," "1," "2," and "3"). Accordingly, a UE 115 may have sufficient opportunities for channel estimation and reporting.

Figure 4:
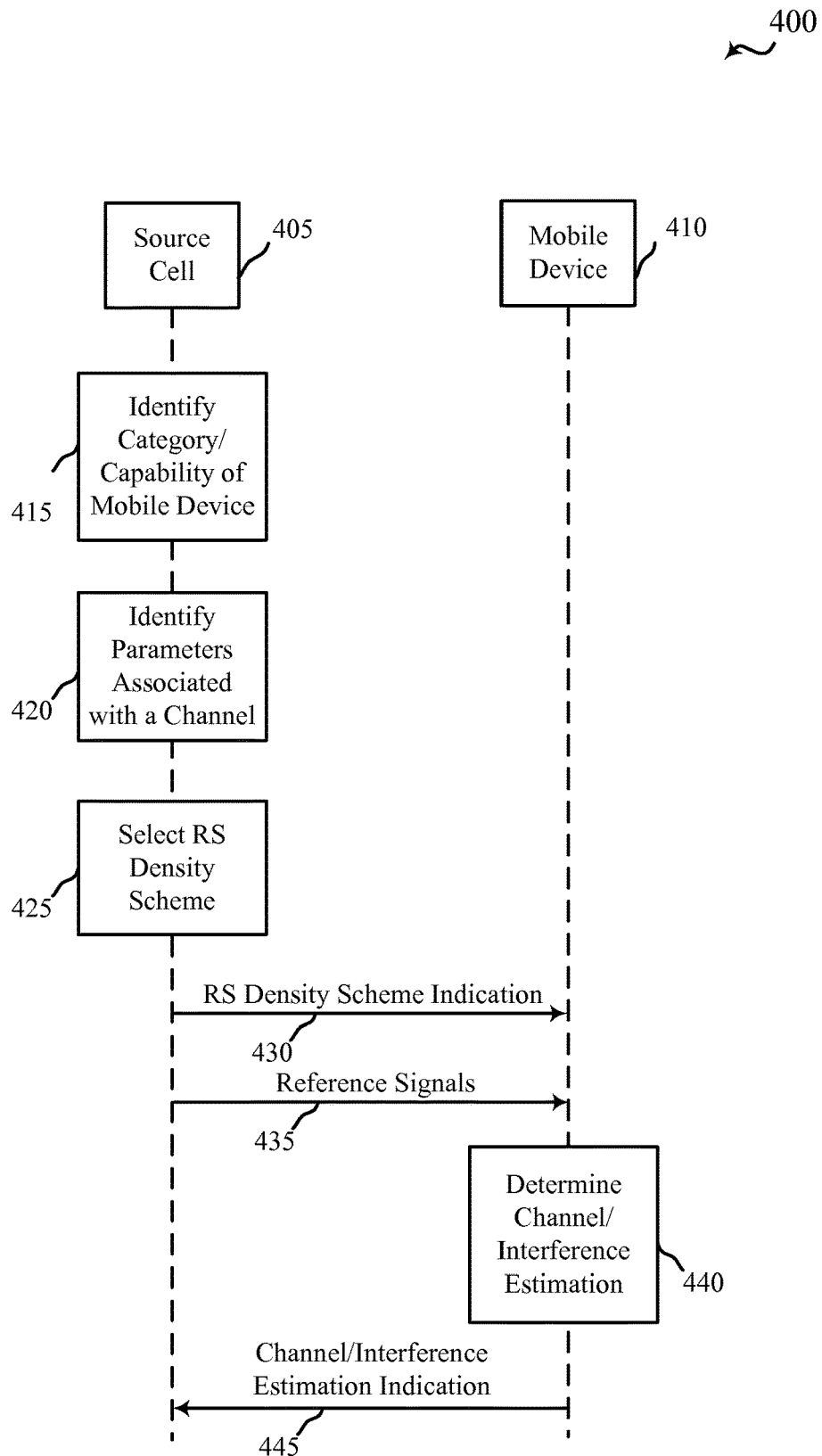
FIG. 4 shows a message flow diagram illustrating aspects of reference signal design in wireless communications, in accordance with aspects of the present disclosure.

FIG. 4 shows a message flow diagram 400 illustrating aspects of reference signal design in wireless communications, in accordance with aspects of the present disclosure. The message flow diagram 400 may illustrate aspects of the wireless communications system 100 described with reference to FIG. 1. The message flow diagram 400 includes a source cell 405 and a mobile device 410. The source cell 405 may be an example of aspects of one or more of the base stations 105 described with reference to FIG. 1 or 3, or source cell 205 described with reference to FIG. 2. The mobile device 410 may be an example of aspects of one or more of the UEs 115 described above with reference to FIG. 1 or 3, or mobile device 210 described with reference to FIG. 2. Generally, the message flow diagram 400 illustrates aspects of implementing reference signal density scheme design in wireless communication systems. In some examples, a system device, such as one of the UEs 115 or base stations 105 described with reference to FIG. 1 or 3, or source cell 205 or mobile device 210 described with reference to FIG. 2 may execute sets of codes to control the functional elements of the device to perform some or all of the functions described below.

At block 415, the source cell 405 may identify a mobile device category or mobile device capability of the mobile device 410. In some examples the category may be related to a configuration of the mobile device 410 to use reduced communication resources, e.g., reduced data rate, reduced bandwidth, etc., than otherwise available via the source cell 405, e.g., an eMTC device. Additionally or alternatively, the mobile device category or mobile device capability for the mobile device 410 may be associated with a mobile device 410 that may benefit from coverage enhancements, from communication configurations selected to support a particular transmission mode, etc.

At block 420, the source cell 405 may identify parameters associated with a channel. For instance, in some examples, the source cell 405 may identify a number of ports available to the source cell 405 for RS transmission. In various examples the source cell 405 may have one port, two ports, three ports, and so forth, available to transmit RSs to the mobile device 410. The port count may be determined based at least in part on the configuration of the source cell 405, on the available (or free) ports of the source cell 405, and the like. In some examples, the mobile device 410 may be aware of the port count for the source cell 405, e.g., by decoding a physical broadcast channel (PBCH) and an associated RS frequency shift. Additionally or alternatively, the mobile device 410 may be aware of the supported system bandwidth of the source cell 405 by decoding the PBCH.

At block 425, the source cell 405 may select an RS density scheme from a set of RS density schemes available for RS transmissions, e.g., any one of the RS density schemes illustrated in diagrams 300. For instance, the RS density scheme may be based at least in part on the port count of the source cell 405, and additionally or alternatively may be based at least in part on the mobile device category or mobile device capability of the mobile device 410, or the category the mobile device 410 is otherwise operating in. In some examples, the RS density scheme may provide for additional RSs within a given PRB, e.g., the RS density schemes illustrated in diagrams 300-b or 300-d. The RS transmitted according to the selected RS density scheme may include a cell specific reference signal (CRS), a demodulation reference signal (DM-RS), which may be referred to as a UE-specific reference signal, or combinations thereof.

In some aspects, the RS density scheme may support both broadcast and unicast transmissions. For example, an MTC system information block (SIB) may provide an indication of the RS density scheme. The RS density scheme may support TTI bundling as well as non-bundling for TTI. The RS density scheme may support standard length cyclic prefixes (CP) as well as extended length CP. In some examples, the RS density scheme may support heterogeneous networks, e.g., LTE systems utilizing licensed or unlicensed spectrum.

At 430, the source cell 405 may send a signal to the mobile device 410 that includes an indication of the selected RS density scheme, which may be transmitted in dedicated signaling or a broadcast transmission. For example, the source cell 405 may send a DCI element via a control channel to inform the mobile device 410 of the selected RS density scheme. In some examples, the source cell 405 may also send, via the DCI element, an indication of whether DM-RS REs are being utilized in the selected RS density scheme. The mobile device 410 may, however, determine aspects of the selected RS density scheme based on its knowledge of the available port count and/or its category, e.g., via decoding the PBCH.

At 435, the source cell 405 may send the RSs to the mobile device 410 according to the selected RS density scheme. In various examples, the source cell 405 may send a CRS, a DM-RS, or combinations thereof, in the REs of the PRB/subframe as defined by the RS density scheme.

At block 440, the mobile device 410 may determine at least one of a channel estimation or an interference estimation for the transmitted RS REs. For example, the mobile device 410 may determine various channel conditions parameters, e.g., signal-to-noise ratio, signal-to-interference noise ratio, etc., based on measuring the RSs transmitted according to the selected RS density scheme. In some examples where the RS density scheme includes CRS and DM-RS, the mobile device 410 may perform various combination functions to determine the channel estimation or interference estimation.

Figure 5:
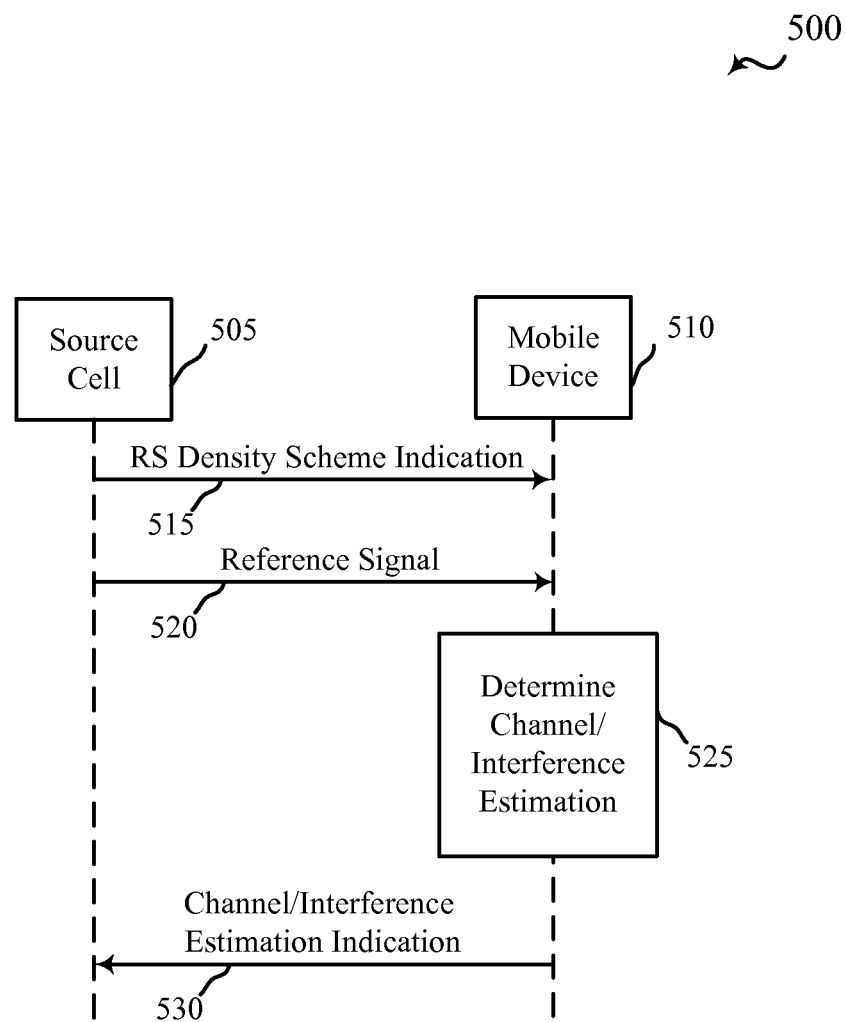
FIG. 5 shows a message flow diagram illustrating aspects of reference signal design in wireless communications, in accordance with aspects of the present disclosure.

At 445, the mobile device 410 may send a message to the source cell 405 that includes an indication of the channel measurements and estimations or interference measurements and estimations. In examples where a higher density RS density scheme with additional REs was selected, the channel estimation or interference estimation reporting may provide for improved and/or more accurate channel condition determination. Accordingly, the source cell 405 may have improved information regarding the channel conditions and, therefore, make more informed decisions regarding MCS selection, throughput capability, data rate, transmission power, etc FIG. 5 shows a message flow diagram 500 illustrating aspects of reference signal design in wireless communications, in accordance with aspects of the present disclosure. The message flow diagram 500 may illustrate aspects of the wireless communications system 100 described with reference to FIG. 1. The message flow diagram 500 includes a source cell 505 and a mobile device 510. The source cell 505 may be an example of aspects of one or more of the base stations 105 described with reference to FIG. 1 or 3, or source cells 205 or 405 described with reference to FIG. 2 or 4. The mobile device 510 may be an example of aspects of one or more of the UEs 115 described with reference to FIG. 1 or 3, or mobile devices 210 or 410 described with reference to FIG. 2 or 4. Generally, the message flow diagram 500 illustrates aspects of implementing reference signal density scheme design in wireless communication systems. In some examples, a system device, such as one of the UEs 115, base stations 105, source cells 205 or 405, or mobile devices 210 or 410 may execute sets of codes to control the functional elements of the device to perform some or all of the functions described below.

At 515, the source cell 505 may send a signal to the mobile device 510 that includes an indication of an RS density scheme selected from a set of RS density schemes. The RS density scheme may be selected based at least in part on any one or more of the mobile device category or mobile device capability of the mobile device 510, or one or more parameters associated with a channel, which in some examples may be related to a port count of the source cell 505. For example, the source cell 505 may send a DCI element via a control channel to inform the mobile device 510 of the selected RS density scheme. In some examples, the source cell 505 may also send, via the DCI element, an indication of whether DM-RS REs are being utilized in the selected RS density scheme.

At 520, the source cell 505 may send the RSs to the mobile device 510 according to the selected RS density scheme. In various examples, the source cell 505 may send a CRS, a DM-RS, or combinations thereof, in the REs of the PRB/subframe as defined by the RS density scheme.

At block 525, the mobile device 510 may determine at least one of a channel estimation or an interference estimation for the transmitted RS REs. For example, the mobile device 510 may determine various channel conditions or interference conditions, e.g., signal-to-noise ratio, signal-to-interference noise ratio, etc., based on measuring the RSs transmitted according to the selected RS density scheme. In some examples where the RS density scheme includes CRS and DM-RS, the mobile device 510 may perform various combination functions to determine the channel estimation or interference estimation.

Figure 6:
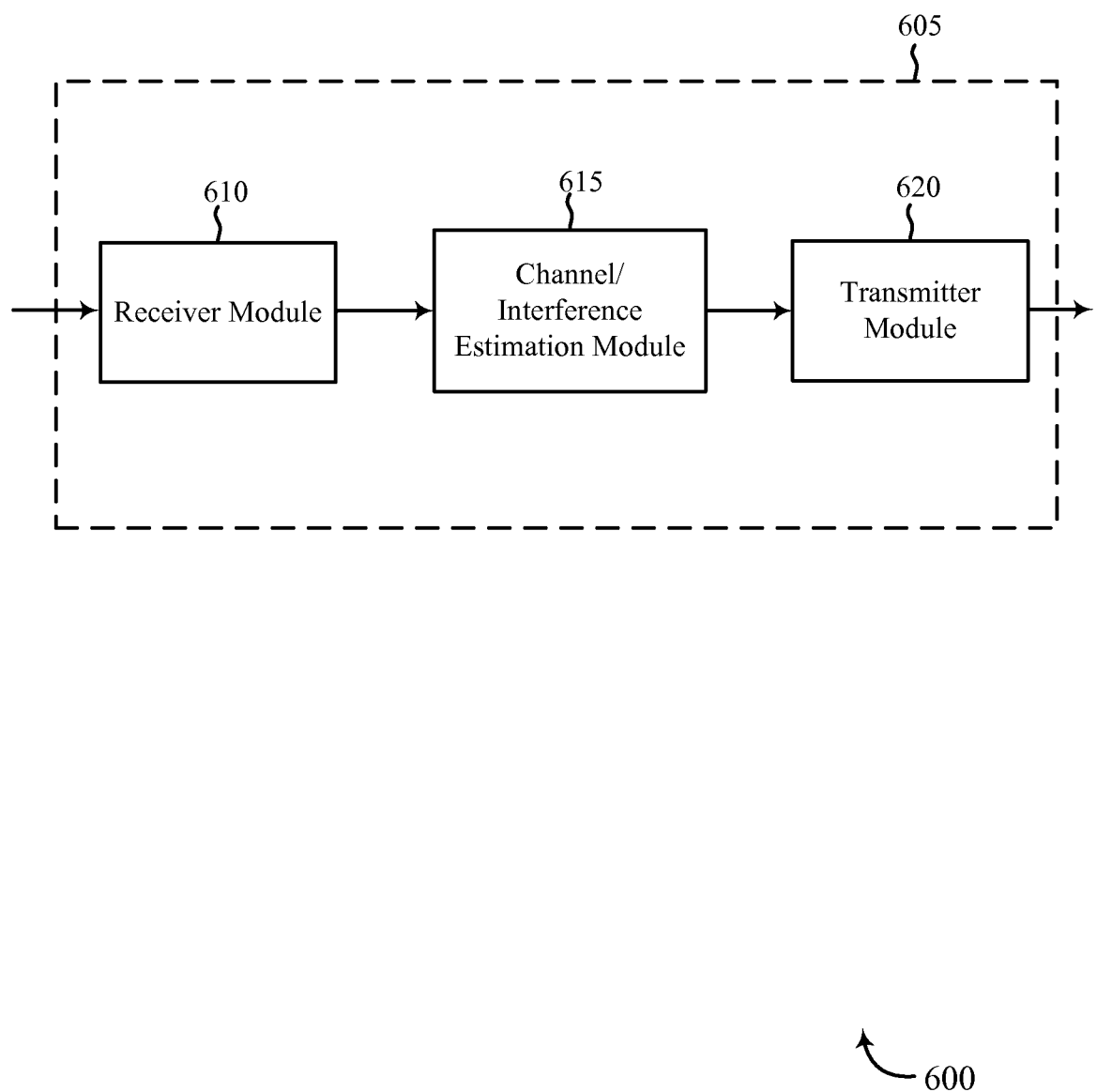
FIG. 6 shows a block diagram of a device configured for use in wireless communication, in accordance with aspects of the present disclosure.

At 530, the mobile device 510 may send a message to the source cell 505 that includes an indication of the channel measurements and estimations. In examples where a higher density RS density scheme with additional REs was selected, the channel estimation reporting may provide for improved and/or more accurate channel condition determination. Accordingly, the source cell 505 may have improved information regarding the channel conditions and, therefore, make more informed decisions regarding MCS selection, throughput capability, data rate, transmission power, etc FIG. 6 shows a block diagram 600 of a device 605 configured for use in wireless communication, in accordance with aspects of the present disclosure. The device 605 may be an example of aspects of one or more of UEs 115 described with reference to FIG. 1 or 3, or mobile devices 210, 410, or 510 described with reference to FIG. 2, 4, or 5, respectively. The device 605 may include a receiver module 610, a channel/interference estimation module 615, and a transmitter module 620. The device 605 may also be or include a processor (not shown). Each of these modules may be in communication with one another.

The components of the device 605 may, individually or collectively, be implemented using one or more application-specific integrated circuits (ASICs) adapted to perform some or all of the applicable functions in hardware. Additionally or alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may be implemented, in whole or in part, with instructions embodied in a memory, formatted to be executed by one or more general or application-specific processors.

The receiver module 610 may receive information such as packets, user data, or control information associated with various information channels (e.g., control channels, data channels, etc.). The receiver module 610 may be configured to receive an indication of an RS density scheme from a base station 105, as well as receiving RSs being transmitted according to the RS density schemes. The information may be received in dedicated signaling or a broadcast transmission, and may include one or more of a CRS or a DM-RS, or a combination thereof. Information may be passed on to the channel/interference estimation module 615, and to other components of the device 605.

The channel/interference estimation module 615 may determine a channel quality indication based on receipt and measurement of an RS and transmit the channel quality indication to a base station 105. The channel/interference estimation module 615 may receive, via the receiver module 610, an indication from the base station 105 of an RS density scheme selected for use by the device 605. In some examples the channel/interference estimation module 615 may identify the RS density scheme based at least in part on one of a type of a channel coverage or a coverage enhancement for the channel.

In some examples, the RS density scheme may have been selected by the base station 105 based at least in part on the mobile device category or mobile device capablity of the device 605, e.g., based on the device 605 being or otherwise operating as an MTC device or an eMTC device. Additionally or alternatively, the RS density scheme may have been selected by the base station 105 based at least in part on one or parameters associated with a channel, which in some examples may be associated with the port count of the base station 105, e.g., the antenna ports available to the base station 105 for RS transmissions. Accordingly, the channel/interference estimation module 615 may receive the RS transmitted according to the indicated RS density scheme, and perform channel measurements based on the RS. The channel/interference estimation module 615 may subsequently pass on an indication of at least one of the channel estimation or the interference estimation to the transmitter module 620 for transmission to the base station 105.

In some examples, a higher density RS density scheme may be selected to provide additional RS REs to the device 605, e.g., to provide more opportunities for the channel/interference estimation module 615 to measure and report the current channel conditions. Accordingly, the base station may have improved information regarding the channel conditions and, therefore, make more informed decisions regarding MCS selection, throughput capability, data rate, transmission power, etc.

The transmitter module 620 may transmit the one or more signals received from other components of the device 605. The transmitter module 620 may transmit an indication of the channel estimation information to the base station 105. In some examples, the transmitter module 620 may be collocated with the receiver module 610 in a transceiver module.

Figure 7:
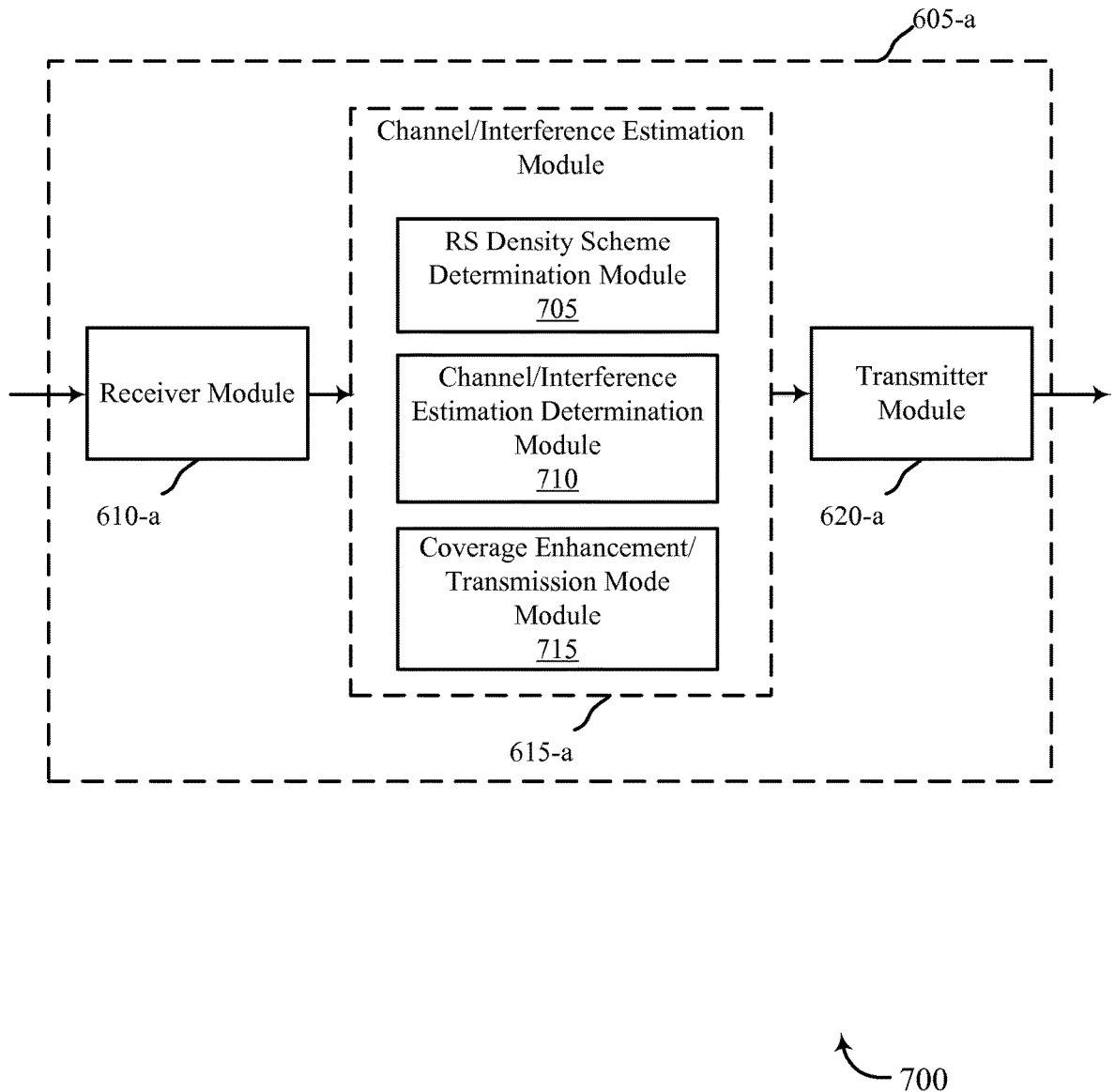
FIG. 7 shows a block diagram of a device configured for use in wireless communication, in accordance with aspects of the present disclosure.

FIG. 7 shows a block diagram 700 of a device 605-*a* configured for use in wireless communication, in accordance with aspects of the present disclosure. The device 605-*a* may be an example of aspects of one or more of UEs 115 described with reference to FIG. 1 or 3, a mobile devices 210, 410, or 510 described with reference to FIG. 2, 4, or 5, or device 605 described with reference to FIG. 6. The device 605-*a* may include a receiver module 610-*a*, a channel/interference estimation module 615-*a*, and a transmitter module 620-*a*, which may be examples of the corresponding modules of device 605. The device 605-*a* may also include a processor (not shown). Each of these components may be in communication with each other. The channel/interference estimation module 615-*a* may include an RS density scheme determination module 705, a channel/interference estimation determination module 710, and a coverage enhancement/transmission mode module 715. The receiver module 610-*a* and the transmitter module 620-*a* may perform the functions of the receiver module 610 and the transmitter module 620, as described with reference to FIG. 6, respectively.

The RS density scheme determination module 705 may receive, via the receiver module 610-*a*, one or more messages, e.g., a DCI element in a control channel, from a base station 105 that includes an indication of an RS density scheme selected by the base station 105. The RS density scheme determination module 705 may, based on the indication, determine which REs within a PRB, a group of PRBs, a subframe, a group of subframes, or combinations thereof, may include RSs for channel estimation. In some examples the RS density scheme determination module 705 may identify the RS density scheme based at least in part on one of a type of a channel or a coverage enhancement for the channel. In some examples, the type of channel may include at least one of a broadcast channel or a unicast channel. In some examples, the type of channel may include at least one of a control data or a data channel, which in some examples may be a PDCCH or a PDSCH. In some RS density schemes, additional RS REs may be allocated for at least one of channel estimation measurements or interference estimation measurements to support at least one of the mobile device category of the device 605-*a*, the mobile device capability of the device 605-*a*, or one or more parameters of the channel, which in some examples may be associated with the port count for the base station 105, etc. Additionally or alternatively, the message(s) may include an indication of whether the selected RS density scheme may include CRS, DM-RS, or combinations thereof.

The channel/interference estimation determination module 710 may, in cooperation with the receiver module 610-*a* or the RS density scheme determination module 705, receive the RSs in the REs associated with the RS density scheme and measure the RSs to determine channel conditions. For instance, the channel/interference estimation determination module 710 may, for one or more of the channels, determine interference levels, received signal strength, etc., to identify the operational conditions of the channel. In the case where the indicated RS density scheme includes DM-RS, the channel/interference estimation determination module 710 may perform various combination functionality to determine the channel estimations or interference estimations, e.g., weighting, averaging, etc., for the CRS and the DM-RS transmissions. In some aspects, the DM-RS may be included in the RS density scheme to provide enhanced channel measurements and estimations or enhanced interference measurements and estimations.

The coverage enhancement/transmission mode module 715 may determine, for the device 605-*a*, whether one or more of a coverage enhancement or a particular transmission mode is applicable. For example, the device 605-*a* may be, or be otherwise operating as an MTC device, a narrowband MTC device, a narrowband UE, a Category 0 UE, etc., which may be associated with reduced communication requirements, e.g., reduced data rate, limited data transmission, lower bandwidth, etc. Accordingly, the device 605-*a* may be of a mobile device category or a mobile device capability that may benefit from a coverage enhancement from the base station 105. In another example, the device 605-*a* may desire to use a transmission mode that would benefit from additional channel estimation or interference estimation measurements and reporting, e.g., broadcast transmissions which, may be bursty transmissions. Accordingly, the coverage enhancement/transmission mode module 715 may send a signal to the base station 105 indicating its category and/or requirements. The base station 105 may select an RS density scheme that considers the category/capability/need of the device 605-*a* and, therefore, selects an RS density scheme that provides sufficient channel estimation or interference estimation opportunities.

Figure 8:
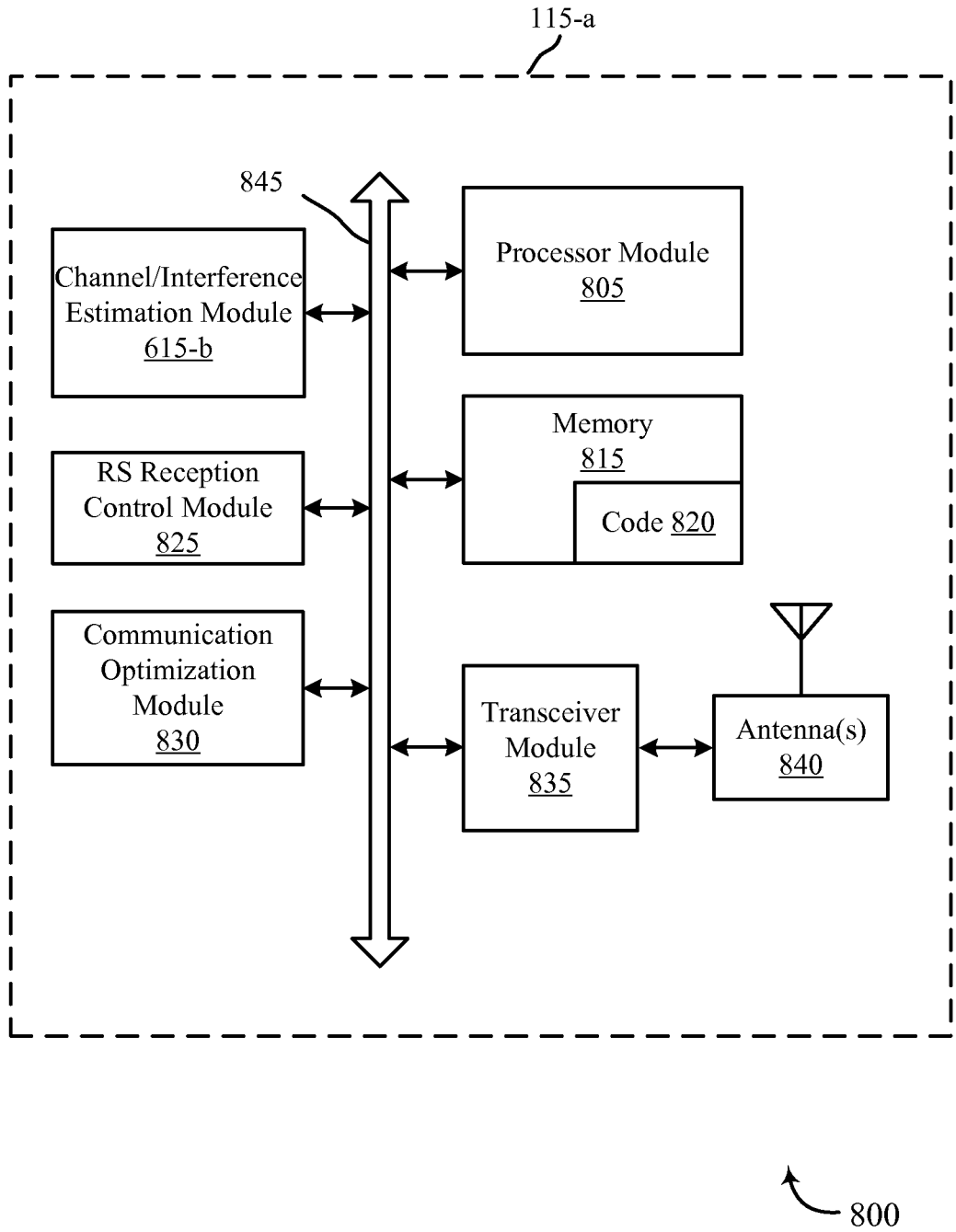
FIG. 8 shows a system for use in wireless communication, in accordance with aspects of the present disclosure.

FIG. 8 shows a system 800 for use in wireless communication, in accordance with aspects of the present disclosure. System 800 may include a UE 115-a, which may be an example of aspects of one or more of UEs 115 described with reference to FIG. 1 or 3, mobile devices 210, 410, or 510 described with reference to FIGS. 2, 4, and 5, or devices 605 described with reference to FIGS. 6 and 7.

The UE 115-a may generally include components for bi-directional voice and/or data communications including components for transmitting communications and components for receiving communications. The UE 115-a may include one or more antennas 840, a transceiver module 835, a processor module 805, and memory 815 (including code 820), which each may communicate, directly or indirectly, with each other (e.g., via one or more buses 845). The transceiver module 835 may be configured to communicate bi-directionally, via the one or more antennas 840 or one or more wired or wireless links, with one or more networks, as described above. For example, the transceiver module 835 may be configured to communicate bi-directionally with any one or more of base stations 105 described with reference to FIGS. 1 and 3, and source cells 205, 405, or 505 described with reference to FIGS. 2, 4, and 5. The transceiver module 835 may include a modem configured to modulate the packets and provide the modulated packets to the one or more antennas 840 for transmission, and to demodulate packets received from the one or more antennas 840. The UE 115-a may have one or more antennas 840 capable of concurrently transmitting and/or receiving multiple wireless transmissions. The transceiver module 835 may be capable of concurrently communicating with one or more base stations 105 via multiple component carriers.

The UE 115-a may include a channel/interference estimation module 615-b, which may perform the functions described above for the channel/interference estimation modules 615 described with reference to FIGS. 6 and 7. The UE 115-a may also include an RS reception control module 825 and a communication optimization module 830. The RS reception control module 825 may control aspects of the UE 115-a performing channel estimations or interference estimations based on receipt of RSs according to an RS density scheme for the UE 115-a. The RS density scheme may be selected based on the UE 115-a being, or otherwise operating as an MTC device, a narrowband MTC device, etc., and may be a higher density RS density scheme having additional RS REs. The additional RS REs may provide for increased channel estimation, interference estimation, and reporting opportunities for the UE 115-a.

The communication optimization module 830 may provide for improved communication functionality for the UE 115-a. For example, the communication optimization module 830 may determine and report at least one of a category of the UE 115-a, a category the UE 115-a is operating in, or a communication parameter for the UE 115-a to a base station 105 to permit selection of an RS density scheme that supports the requirements of the UE 115-a.

The memory 815 may include random access memory (RAM) and read-only memory (ROM). The memory 815 may store computer-readable, computer-executable software/firmware code 820 containing instructions that are configured to, when executed, cause the processor module 805 to perform various functions described herein (e.g., perform channel estimation and reporting based on RS REs associated with an RS density scheme, etc.). Alternatively, the computer-readable, computer-executable software/firmware code 820 may not be directly executable by the processor module 805 but be configured to cause a computer (e.g., when compiled and executed) to perform functions described herein. The processor module 805 may include an intelligent hardware device, e.g., a central processing unit (CPU), a microcontroller, an application-specific integrated circuit (ASIC), etc.

Figure 9:
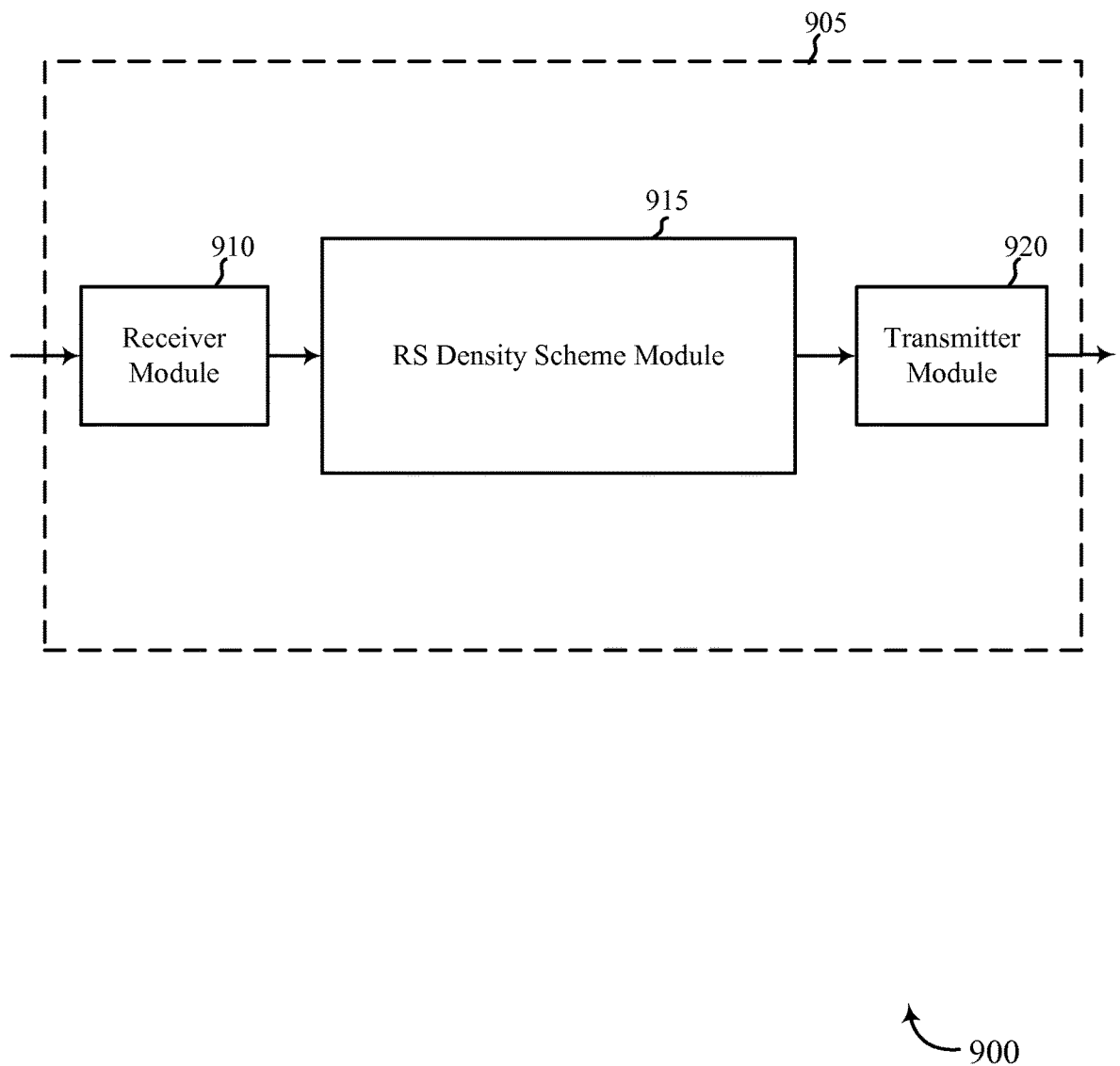
FIG. 9 shows a block diagram of an apparatus for use in wireless communication, in accordance with aspects of the present disclosure.

FIG. 9 shows a block diagram 900 of an apparatus 905 for use in wireless communication, in accordance with aspects of the present disclosure. In some examples, the apparatus 905 may be an example of aspects of one or more of the base stations 105 described with reference to FIG. 1 or 3, or source cells 205, 405, or 505 described with reference to FIGS. 2, 4, and 5. In some examples, the apparatus 905 may be part or include an LTE/LTE-A eNB and/or an LTE/LTE-A base station. The apparatus 905 may also be a processor. The apparatus 905 may include a receiver module 910, an RS density scheme module 915, and a transmitter module 920. Each of these modules may be in communication with each other.

The components of the apparatus 905 may, individually or collectively, be implemented using one or more ASICs adapted to perform some or all of the applicable functions in hardware. Additionally or alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver module 910 may include at least one radio frequency (RF) receiver, such as an RF receiver operable to receive at least one of channel estimation or interference estimation reporting signals from UEs 115 associated with the apparatus 905. The receiver module 910 may be used to receive various types of data or control signals (e.g., transmissions) over one or more communication links of a wireless communication system, such as one or more communication links of the wireless communications system 100 described with reference to FIG. 1.

In some examples, the transmitter module 920 may include at least one RF transmitter, such as at least one RF transmitter operable to transmit RSs, e.g., CRS, DM-RS, or combinations thereof. The transmitter module 920 may be used to transmit various types of data and/or control signals (e.g., transmissions) over one or more communication links of a wireless communication system, such as one or more communication links of the wireless communications system 100 described with reference to FIG. 1. The transmitter module 920 may be configured to transmit RSs by a unicast or broadcast channel type, and may be configured to transmit over a control channel type or a data channel type, such as a PDCCH or PDSCH channel type.

In some examples, the RS density scheme module 915 may select an RS density scheme from a set of RS density schemes available for RS transmissions. The selection of an RS density scheme may be based at least in part on any one or more of a parameter associated with a channel, which in some examples may be associated with a port count of the apparatus 905, a mobile device category of a UE 115 receiving the RS transmissions, or a mobile device capability of a UE 115 receiving the RS transmissions. For example, the RS density scheme module 915 may identify any one or more of the UE category, the category the UE 115 is otherwise operating in, or the port count and select an RS density scheme from a set of RS density schemes available for selection. The set of available RS density schemes may include a higher density RS density scheme that provide for additional channel estimation and measurement opportunities or interference estimation and measurement opportunities for the UE 115. The RS density scheme module 915 may, via the transmitter module 920, transmit the RS to the UE 115 according to the determined RS density scheme. In some examples, the transmission of RSs may include one or more of a CRS or a DM-RS or a combination thereof. The RS density scheme module 915 may also transmit an indication of an RS density scheme to a UE 115.

Figure 10:
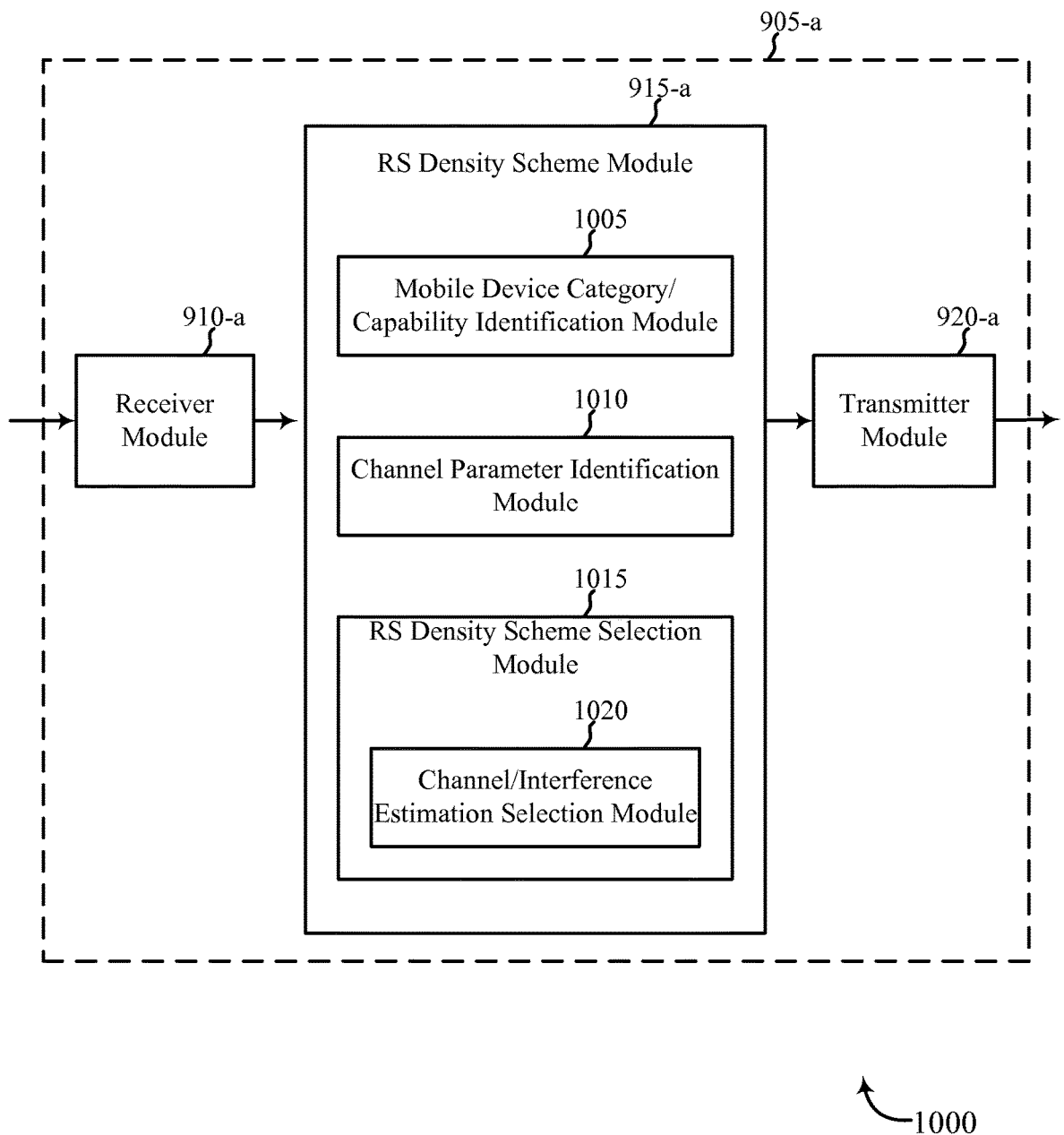
FIG. 10 shows a block diagram of an apparatus for use in wireless communication, in accordance with aspects of the present disclosure.

FIG. 10 shows a block diagram 1000 of an apparatus 905-*a* for use in wireless communication, in accordance with aspects of the present disclosure. In some examples, the apparatus 905-*a* may be an example of aspects of one or more of base stations 105 described with reference to FIGS. 1 and 3, source cells 205, 405, or 505 described with reference to FIGS. 2, 4, and 5, or apparatus 905 described with reference to FIG. 9. In some examples, the apparatus 905-*a* may be part or include an LTE/LTE-A eNB or an LTE/LTE-A base station. The apparatus 905-*a* may also be a processor. The apparatus 905-*a* may include a receiver module 910-*a*, an RS density scheme module 915-*a*, and/or a transmitter module 920-*a*. Each of these modules may be in communication with each other.

The components of the apparatus 905-*a* may, individually or collectively, be implemented using one or more ASICs adapted to perform some or all of the applicable functions in hardware. Additionally or alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver module 910-*a* may be an example of one or more aspects of the receiver module 910 described with reference to FIG. 9. In some examples, the receiver module 910-*a* may include at least one radio frequency (RF) receiver, such as at least one RF receiver operable to receive messages from a UE 115 providing an indication of at least one of channel estimations or interference estimations. The receiver module 910-*a* may be used to receive various types of data and/or control signals (e.g., transmissions) over one or more communication links of a wireless communication system, such as one or more communication links of the wireless communications system 100 described with reference to FIG. 1.

In some examples, the transmitter module 920-*a* may be an example of one or more aspects of the transmitter module 920 described with reference to FIG. 9. In some examples, the transmitter module 920-*a* may include at least one RF transmitter, such as at least one RF transmitter operable to transmit RSs in REs according to a selected RS density scheme. The transmitter module 920-*a* may be used to transmit various types of data and/or control signals (i.e., transmissions) over one or more communication links of a wireless communications system, such as one or more communication links of the wireless communications system 100 described with reference to FIG. 1. The transmitter module 920-*a* may be configured to transmit RSs by a unicast or broadcast channel type, and may be configured to transmit over a control channel type or a data channel type, which in some examples may be a PDCCH or PDSCH channel type.

In some examples, the RS density scheme module 915-*a* may include a mobile device category/capability identification module 1005, a channel parameter identification module 1010, and an RS density scheme selection module 1015. The RS density scheme selection module 1015 may include a channel/interference estimation selection module 1020. The mobile device category/capability identification module 1005 may identify at least one of a category associated with a mobile device or a category a mobile device is otherwise operating in. The mobile device category may be an MTC device, a narrowband MTC device, a narrowband UE, or combinations thereof. In some examples, the mobile device category is Category 0.

In some aspects, the mobile device category/capability identification module 1005 may identify a coverage enhancement for a mobile device and select an RS density scheme based at least in part on the identified coverage enhancement, For example, the mobile device category/capability identification module 1005 may receive, via the receiver module 910-*a*, a message from a mobile device indicating an operational capability for the mobile device. The operational capability may include an indication that the mobile device may benefit from an improved coverage area provided by the apparatus 905-*a*, e.g., a 10 dB, a 15 dB, a 20 dB, etc., increase in coverage provided by the apparatus 905-*a*. A higher density RS density scheme may be selected to provide channel estimation to support the enhanced coverage.

In some aspects, the mobile device category/capability identification module 1005 may identify a transmission mode for the mobile device and select the RS density scheme based at least in part on the identified transmission mode. For example, the transmission mode may be a broadcast transmission mode and the selected RS density scheme may be a higher density RS density scheme having more RS REs within the PRB/subframe. In contrast, a unicast transmission mode may include selecting a lower density RS density scheme that includes fewer RS REs.

The channel parameter identification module 1010 may, in some examples, determine which antenna ports are available to the apparatus 905-*a* for transmitting RSs. For example, the apparatus 905-*a* may include or otherwise have available one-port, two-ports, three-ports, etc., for transmitting RSs. The available antenna ports may determine the port count for the apparatus 905-*a*.

The RS density scheme selection module 1015 may select an RS density scheme from a set of RS density schemes available for RS transmission. An RS density scheme may be selected based on one or more parameters associated with a channel, the mobile device category associated with the mobile device, and/or the mobile device capability associated with the mobile device. The set of RS density schemes may include a lower density RS density scheme and a higher density RS density scheme. The higher density RS density scheme may include more RS REs than the lower density RS density scheme. In some examples, the higher density RS density scheme may be backwards compatible with the lower density RS density scheme, e.g., include at least the same RS REs as the lower density RS density scheme in addition to the new RS REs. The selected RS density scheme may include a cell-specific reference signal (CRS) or a demodulation reference signal (DM-RS) or a combination thereof being transmitted to one or more mobile devices.

In some aspects, the RS density scheme selection module 1015 may include increasing a number of RSs transmitted to the mobile device based at least in part on the identified mobile device category or mobile device capability of the mobile device. For example, the RS density scheme may include twenty (20) RS REs within a subframe.

In some aspects, the RS density scheme selection module 1015 may, via the transmitter module 920-*a*, transmit a message to the mobile device that includes an indication of the selected RS density scheme. For example, the message may be a DCI element in a control channel transmitted to the mobile device. The message may also include an indication of whether a DM-RS is included in the selected RS density scheme.

The channel/interference estimation selection module 1020 may determine at least one of a channel estimation requirement or an interference estimation requirement, which may be used to select an RS density scheme. In some examples, the channel/interference estimation selection module 1020 may receive a channel quality indication from a mobile device that is based on a transmitted reference signal. Depending on any one or more of the mobile device category of the UE, the mobile device capability of the UE, one or more parameters associated with a channel such as a port count, the communication mode of the UE, etc., the channel/interference estimation selection module 1020 may determine and output information indicating that additional channel estimation, interference estimation, or reporting may be required and, therefore, a higher density RS density scheme may be selected. In some examples, the channel/interference estimation selection module 1020 may impact the selected RS density scheme based on channel feedback from the mobile device, receipt of one or more non-acknowledgement (NACK) signals from the mobile device, and the like.

Figure 11:
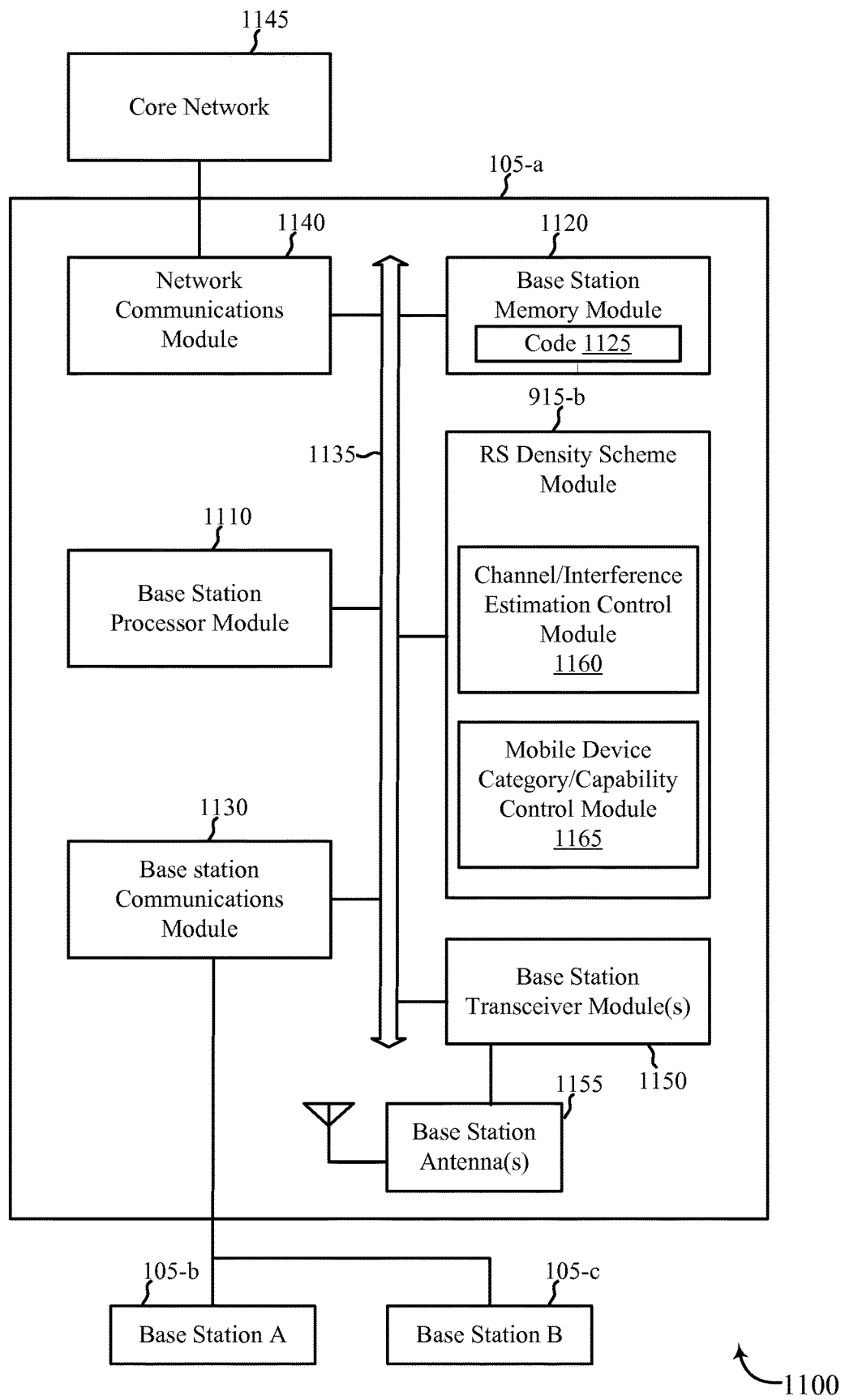
FIG. 11 shows a block diagram of a base station (e.g., a base station forming part or all of an eNB) for use in wireless communication, in accordance with aspects of the present disclosure.

FIG. 11 shows a block diagram 1100 of a base station 105-*a* (e.g., a base station forming part or all of an eNB) for use in wireless communication, in accordance with aspects of the present disclosure. In some examples, the base station 105-*a* may be an example of aspects of one or more of the base stations 105 described with reference to FIGS. 1, 3, and 11, source cells 205, 405, or 505 described with reference to FIGS. 2, 4, and 5, or apparatuses 905 described with reference to FIG. 9 or 10. The base station 105-*a* may be configured to implement or facilitate at least some of the base station or apparatus features and functions described with reference to FIGS. 1-10.

The base station 105-*a* may include a base station processor module 1110, a base station memory module 1120, at least one base station transceiver module (represented by base station transceiver module(s) 1150), at least one base station antenna (represented by base station antenna(s) 1155), and an RS density scheme module 915-*b*. The base station 105-*a* may also include one or more of a base station communications module 1130 and/or a network communications module 1140. Each of these modules may be in communication with each other, directly or indirectly, over one or more buses 1135.

The base station memory module 1120 may include random access memory (RAM) or read-only memory (ROM). The base station memory module 1120 may store computer-readable, computer-executable software/firmware code 1125 containing instructions that are configured to, when executed, cause the base station processor module 1110 to perform various functions described herein related to wireless communication (e.g., select an RS density scheme based on a port count, a category of a mobile device, a category that a mobile device is operating in, etc.). Alternatively, the computer-readable, computer-executable software/firmware code 1125 may not be directly executable by the base station processor module 1110 but be configured to cause the base station 105-*b* (e.g., when compiled and executed) to perform various of the functions described herein.

The base station processor module 1110 may include an intelligent hardware device, e.g., a central processing unit (CPU), a microcontroller, an ASIC, etc. The base station processor module 1110 may process information received through the base station transceiver module(s) 1150, the base station communications module 1130, or the network communications module 1140. The base station processor module 1110 may also process information to be sent to the transceiver module(s) 1150 for transmission through the antenna(s) 1155, to the base station communications module 1130, for transmission to one or more other base stations 105-*b* and 105-*c*, or to the network communications module 1140 for transmission to a core network 1145, which may be an example of one or more aspects of the core network 130 described with reference to FIG. 1. The base station processor module 1110 may handle, alone or in connection with the RS density scheme module 915-*b*, various aspects of RS density scheme selection and, in some aspects, communication to the mobile device.

The base station transceiver module(s) 1150 may include a modem configured to modulate packets and provide the modulated packets to the base station antenna(s) 1155 for transmission, and to demodulate packets received from the base station antenna(s) 1155. The base station transceiver module(s) 1150 may, in some examples, be implemented as one or more base station transmitter modules and one or more separate base station receiver modules. The base station transceiver module(s) 1150 may support communications in a first radio frequency spectrum band or a second radio frequency spectrum band. The base station transceiver module(s) 1150 may be configured to communicate bi-directionally, via the antenna(s) 1155, with one or more UEs or apparatuses, such as one or more of the UEs 115 described with reference to FIGS. 1-10. The base station 105-*a* may, for example, include multiple base station antennas 1155 (e.g., an antenna array). The base station 105-*a* may communicate with the core network 1145 through the network communications module 1140. The base station 105-*a* may also communicate with other base stations, such as the base stations 105-*b* and 105-*c*, using the base station communications module 1130.

The RS density scheme module 915-*b* may be configured to perform or control some or all of the features or functions described with reference to FIGS. 1-10 related to RS density scheme selection. In some examples, the RS density scheme module 915-*b* may identify any one or more of a port count, a category of a mobile device, or a category a mobile device is operating in, and select an RS density scheme from a set of RS density schemes available to supports the mobile device. For example, certain mobile device categories may benefit from extra channel estimation opportunities and a higher density RS density scheme having more RS REs per subframe may be selected. The RS density scheme module 915-*b*, or portions of the RS density scheme module 915-*b*, may include a processor, or some or all of the functions of the RS density scheme module 915-*b* may be performed by the base station processor module 1110 or in connection with the base station processor module 1110. In some examples, the RS density scheme module 915-*b* may be an example of the RS density scheme modules 915 or 915-*a* described with reference to FIG. 9 or 10.

In some examples, the RS density scheme module 915-*b* may include a channel/interference estimation control module 1160 and a mobile device category/capability control module 1165. The channel/interference estimation control module 1160 may determine a channel estimation requirement or an interference estimation requirement for a mobile device based on various factors, e.g., a transmission mode of the mobile device, a coverage enhancement for the mobile device, etc. Accordingly, the channel/interference estimation control module 1160 may determine whether additional RS REs may be provided in the selected RS density scheme to support the added channel estimation or interference estimation opportunities.

In some examples, the mobile device category/capability control module 1165 may determine which mobile device category the mobile device is associated with, or is otherwise operating in, e.g., a MTC device, a narrowband MTC device, a narrowband UE, a Category 0 UE, etc. Accordingly, the mobile device category/capability control module 1165 may determine, based at least in part on the mobile device category or mobile device capability, an RS density scheme that provides sufficient channel estimation or interference estimation opportunities to support the mobile device.

Figure 12:
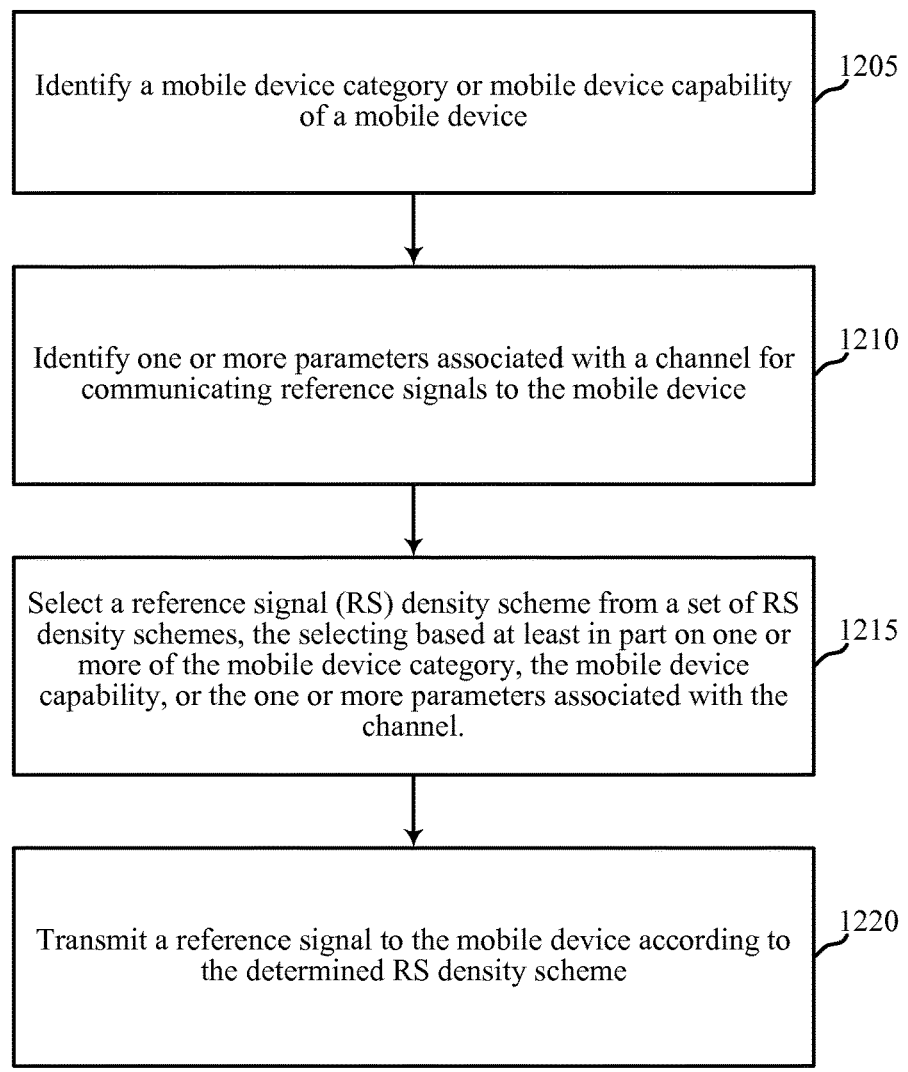
FIG. 12 is a flow chart illustrating an example of a method for wireless communication, in accordance with aspects of the present disclosure.

FIG. 12 is a flow chart illustrating a method 1200 for wireless communication, in accordance with aspects of the present disclosure. For clarity, the method 1200 is described below with reference to aspects of one or more of the base stations 105 described with reference to FIGS. 1, 3 and 11, source cells 205, 405, and 505 described with reference to FIG. 2, 4, or 5, and/or apparatuses 905 described with reference to FIG. 9 or 10. In some examples, a base station may execute one or more sets of codes to control the functional elements of the base station to perform the functions described below. Additionally or alternatively, the base station may perform one or more of the functions described below using special-purpose hardware.

At block 1205, the method 1200 may include identifying a mobile device category or a mobile device capability of a mobile device. For example, the mobile device may be a Category 0 mobile device, or may be otherwise operating as a Category 0 device. In some examples, the mobile device may be associated with or be otherwise operating as an MTC device, a narrowband MTC device, a narrowband UE, and the like. In various examples, the mobile device category or mobile device capability may be associated with a mobile device that utilizes reduced communication functionalities, e.g., reduced data rate, narrow bandwidth, etc. The base station may determine the mobile device category independently or based at least in part on information received from the mobile device, e.g., via a mobile device capabilities announcement message. The operation(s) at block 1205 may be performed using any one or more of the RS density scheme modules 915 described with reference to FIG. 9, 10, or 11.

At block 1210, the method 1200 may include identifying one or more parameters associated with a channel for communicating reference signals to the mobile device. In some example, this may include identifying a port count available for transmitting RSs to the mobile device. The port count may be identified based on the configuration of the base station, e.g., the number of antenna ports, and/or based on the available ports of the base station. In some examples, the port count may be one port, two ports, three ports, and so on. The operations at block 1205 may be performed using any one or more of the RS density scheme modules 915 described with reference to FIG. 9, 10, or 11, channel parameter identification module 1010 described with reference to FIG. 10, or channel/interference estimation control module 1160 described with reference to FIG. 11.

At block 1215, the method 1200 may include selecting an RS density scheme from a set of RS density schemes. For example, for each port count a base station may have one or more RS density schemes available for RS transmission to the mobile device. The RS density scheme may be selected based at least in part on the mobile device category of the mobile device, or the mobile device capability of the mobile device. For example, mobile devices associated with, or otherwise operating in a particular mobile device category may utilize a higher density RS density scheme that includes more RS REs per subframe. The additional RS REs may provide more channel measurement or interference measurement opportunities for the mobile device to improve channel estimation or interference estimation reporting. The operation(s) at block 1205 may be performed using any one or more of the RS density scheme modules 915 described with reference to FIG. 9, 10, or 11, RS density scheme selection module 1015 described with reference to FIG. 10, or channel/interference estimation control module 1160 described with reference to FIG. 11.

At block 1220, the method 1200 may include transmitting an RS to the mobile device according to the selected RS density scheme. For example, the base station may transmit RSs in REs according to the selected RS density scheme to provide sufficient channel measurement, interference measurement, and reporting opportunities. The operation(s) at block 1205 may be performed using any one or more of the RS density scheme modules 915 described with reference to FIG. 9, 10, or 11, transmitter modules 920 described with reference to FIG. 9 or 10, or base station transceiver module(s) 1150 or base station antenna(s) 1155 described with reference to FIG. 11.

Thus, the method 1200 may provide for wireless communication. It should be noted that the method 1200 is just one implementation and that the operations of the method 1200 may be rearranged or otherwise modified such that other implementations are possible.

Figure 13:
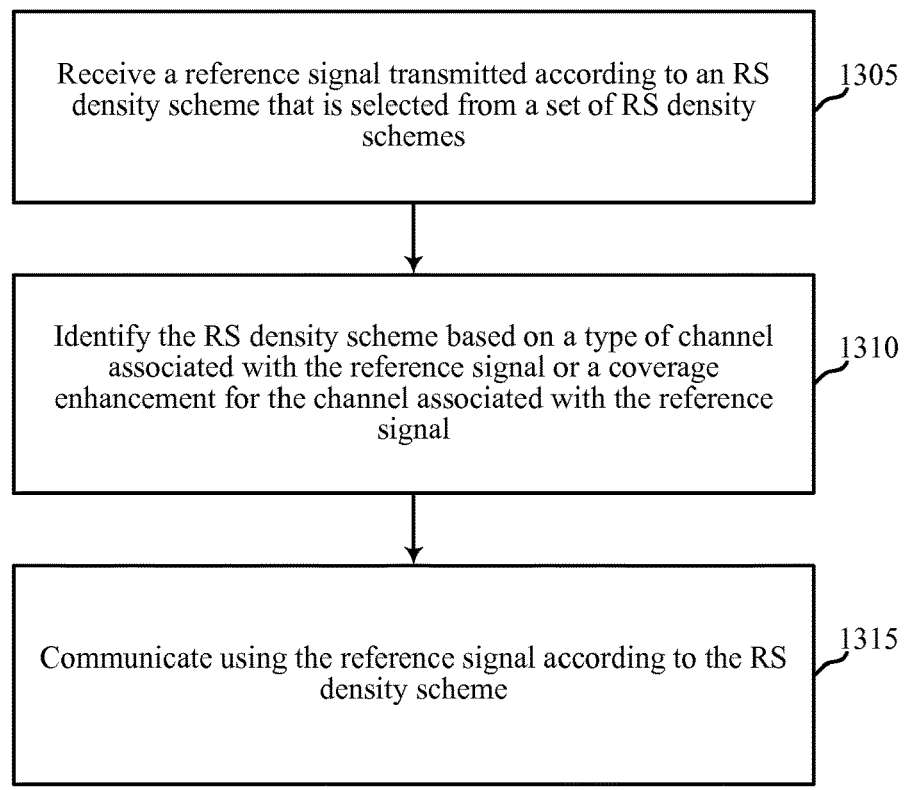
FIG. 13 is a flow chart illustrating an example of a method for wireless communication, in accordance with aspects of the present disclosure.

FIG. 13 is a flow chart illustrating a method 1300 for wireless communication, in accordance with various aspects of the present disclosure. For clarity, the method 1300 is described below with reference to aspects of one or more of the UEs 115 described with reference to FIGS. 1, 3 and 11, mobile devices 210, 410, and 510 described with reference to FIG. 2, 4, or 5, and/or devices 605 described with reference to FIG. 6 or 7. In some examples, a UE may execute one or more sets of codes to control the functional elements of the UE to perform the functions described below. Additionally or alternatively, the UE may perform one or more of the functions described below using special-purpose hardware.

At block 1305, the method 1300 may include receiving an RS transmitted according to an RS density scheme. The RS density scheme may be selected from a set of available RS density schemes. The RS density scheme may also be selected based at least in part on the mobile device category associated with the UE, the mobile device capability associated with the UE in, or one or more parameters associated with the channel. The RS density scheme may be a higher density RS density scheme (e.g., with 20 RS REs per subframe) or a lower density RS scheme having fewer RS REs than the higher density RS scheme. In some examples, receiving the reference signal may include receiving at least one of a CRS or a DM-RS or a combination thereof. The operations at block 1305 may be performed using any one or more of the receiver modules 610 described with reference to FIG. 6 or 7, the channel/interference estimation modules 615 described with reference to FIG. 6, 7, or 8, or the transceiver module 835 and antenna(s) 840 described with reference to FIG. 8.

At block 1310, the method 1300 may include identifying the RS density scheme based at least in part on a type of channel associated with the reference signal or a coverage enhancement for the channel associated with the reference signal. In some examples, the type of channel can be a broadcast channel or a unicast channel. In some examples, the type of channel may be a control channel or a date channel, such as a PDCCH or a PDSCH. In some examples the coverage enhancement of the channel may include a repetition of the channel, and the RS density scheme may be identified based at least in part on a number of repetitions of the channel. The operations at block 1310 may be performed using one or more of the channel/interference estimation modules 615 described with reference to FIG. 6, 7, or 8, or the RS density scheme determination module 705 described with reference to FIG. 7.

At block 1315, the method 1300 may include communicating using the reference signal according to the identified RS density scheme. The communicating may include performing at least one of a channel estimation or an interference estimation using the reference signal, and transmitting an indication of the channel estimation to a serving base station. Accordingly, the serving base station may adjust transmissions to account for the channel conditions and support UE communications. The operations at blocks 1315 may be performed using any one or more of the channel/interference estimation modules 615 described with reference to FIG. 6, 7, or 8, the channel/interference estimation determination module 710 described with reference to FIG. 7, the coverage enhancement/transmission mode module 715 described with reference to FIG. 7, the transmitter modules 620 described with reference to FIG. 6, or 7, or the transceiver module 835 and antenna(s) 840 described with reference to FIG. 8.

Thus, the method 1300 may provide for wireless communication. It should be noted that the method 1300 is just one implementation and that the operations of the method 1300 may be rearranged or otherwise modified such that other implementations are possible.

Figure 14:
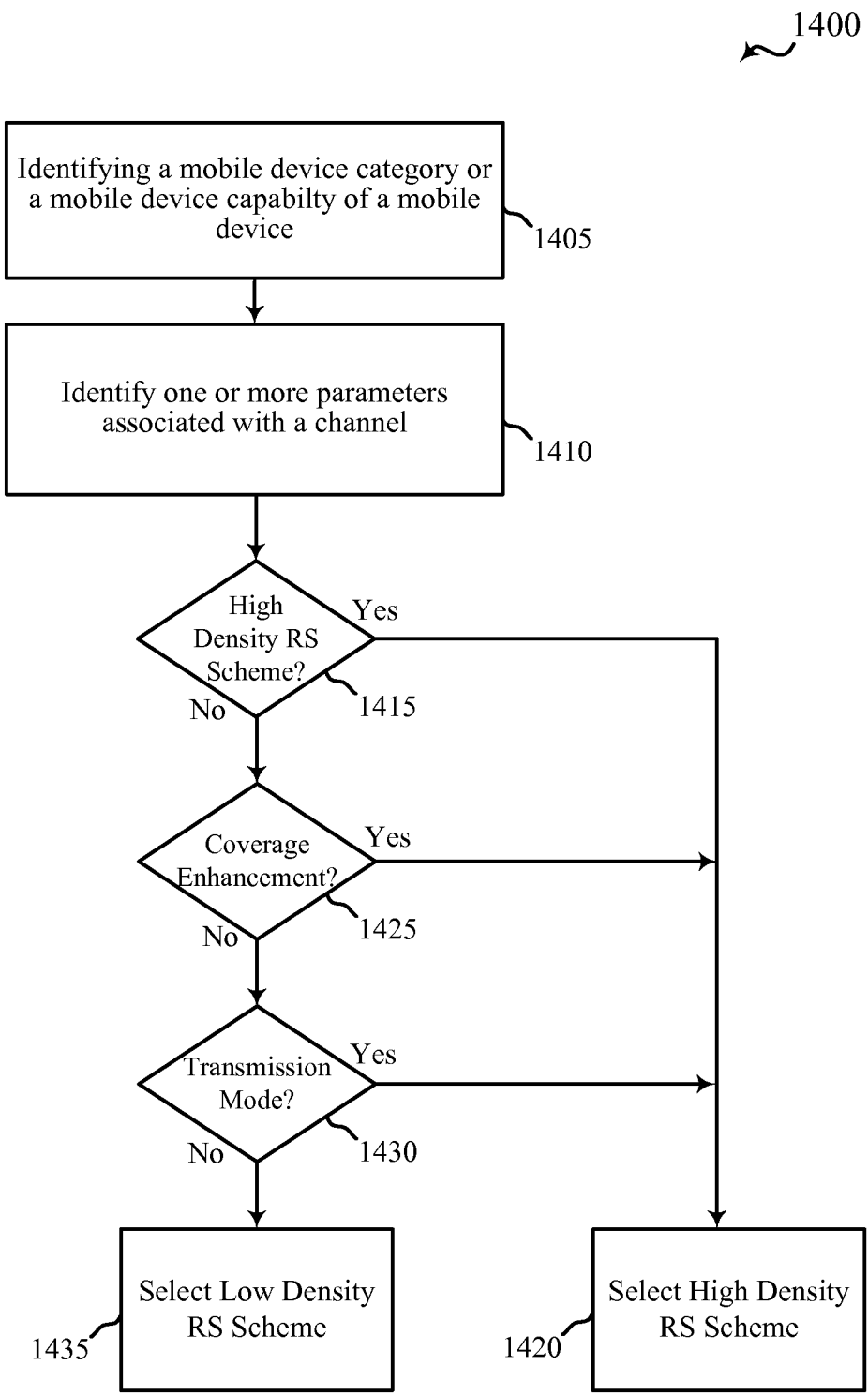
FIG. 14 is a flow chart illustrating an example of a method for wireless communication, in accordance with aspects of the present disclosure.

FIG. 14 is a flow chart illustrating a method 1400 for wireless communication, in accordance with various aspects of the present disclosure. For clarity, the method 1400 is described below with reference to aspects of one or more of the base stations 105 described with reference to FIGS. 1,3 and 11, source cells 205, 405, or 505 described with reference to FIG. 2, 4, or 5, and/or apparatuses 905 described with reference to FIG. 9 or 10. In some examples, a base station may execute one or more sets of codes to control the functional elements of the base station to perform the functions described below. Additionally or alternatively, the base station may perform one or more of the functions described below using special-purpose hardware.

At block 1405, the method 1400 may include identifying a mobile device category or a mobile device capability of a mobile device. The mobile device may be a Category 0 mobile device, or may be otherwise operating as a Category 0 mobile device. In some examples, the mobile device may belong to, or be otherwise operating as an MTC device, a narrowband MTC device, a narrowband UE, and the like. In other examples, the mobile device category or mobile device capability may be associated with a mobile device that utilizes reduced communication functionalities, e.g., reduced data rate, narrow bandwidth, etc. The base station may determine the mobile device category or mobile device capability independently or based on information received from the mobile device, e.g., via a mobile device capabilities announcement message.

At block 1410, the method 1400 may include identifying one or more parameters associated with a channel. In some examples, the method may include identifying a port count for communicating RSs to the mobile device. The port count may be identified based at least in part on the configuration of the base station, e.g., the number of antenna ports, and/or the available ports of the base station. In some examples, the port count may be one port, two ports, three ports, and so on.

At block 1415, the method 1400 may include determining whether a higher density RS scheme should be selected based at least in part on any one or more of the port count of the UE, the category of the UE, or the category the UE is operating in. For example, an RS density scheme may be selected from a set of RS density schemes associated with the port count, the UE category, or the UE capability. In one example, the higher density RS density scheme may be selected if a UE is, or is otherwise operating as an MTC device, is a narrowband MTC device, is a UE operating in a narrowband, is a UE supporting multiple RS density schemes, etc. If a higher density RS density scheme is determined to be selected, the method 1400 may include selecting the higher density RS density scheme at block 1420.

At block 1425, the method 1400 may include determining whether a higher density RS density scheme may be selected based at least in part on a coverage enhancement for the UE. For example, a base station may determine that the UE is experiencing reception problems (e.g., based on receiving a predetermined number of NACK messages from the UE), based on the location of the UE (e.g., at a cell border of the base station), and/or based on an indication received from the UE indicating that coverage enhancement may be needed. The base station may enhance the coverage of the UE by selecting a higher density RS density scheme to provide additional RS REs per subframe for added channel measurement, interference measurement, and reporting. If a higher density RS density scheme is selected based on the coverage enhancement, the method 1400 moves to block 1420 where the higher density RS scheme is selected.

At block 1430, the method 1400 may include determining whether a higher density RS density scheme should be selected based on a transmission mode of the UE. For example, the base station may determine that the UE is engaged in broadcast communications and, therefore, a higher density RS density scheme may provide improved channel estimation, interference estimation, and reporting. The base station may provide improved broadcast transmission coverage based on the added channel estimation or interference estimation reporting.

If no higher density RS density scheme is selected, the method 1400 may move to block 1435 where a lower density RS scheme is selected. The lower density RS scheme may generally have fewer RS REs per subframe than the higher density RS density scheme.

The operation(s) at blocks 1405, 1410, 1415, 1420, 1425, 1430 and/or 1435 may be performed using any one or more of the RS density scheme modules 915 described with reference to FIG. 9, 10, or 11.

Thus, the method 1400 may provide for wireless communication. It should be noted that the method 1400 is just one implementation and that the operations of the method 1400 may be rearranged or otherwise modified such that other implementations are possible.

In some examples, aspects from two or more of the methods 1200, 1300, or 1400 may be combined. It should be noted that the methods 1200, 1300, and 1400 are just example implementations, and that the operations of the methods 1200, 1300, or 1400 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), Institute of Electrical and Electronics Engineers (IEEE) 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication at a wireless device, the method comprising:
    indicating, by the wireless device, that the wireless device is operating according to a machine-type communication (MTC) device category;
    receiving a reference signal (RS) density scheme indication in dedicated signaling sent in downlink control information (DCI);
    monitoring for a reference signal associated with an MTC downlink channel and transmitted according to an RS density scheme based on the RS density scheme indication, the RS density scheme selected from a set of RS density schemes based at least in part on the MTC device category indicated by the wireless device and the MTC downlink channel associated with the reference signal;
    identifying, by the wireless device, the RS density scheme based at least in part on the RS density scheme indication and the MTC downlink channel associated with the reference signal; and
    communicating using the reference signal according to the identified RS density scheme.

2. The method of claim 1, wherein monitoring for a reference signal comprises:
    receiving at least one of a cell-specific reference signal (CRS) or a demodulation reference signal (DM-RS) or a combination thereof.

3. The method of claim 1, wherein identifying the RS density scheme is based on one or more parameters associated with the MTC downlink channel associated with the reference signal.

4. The method of claim 1, wherein identifying the RS density scheme is based at least in part on whether the MTC downlink channel associated with the reference signal is a broadcast channel or a unicast channel.

5. The method of claim 1, wherein identifying the RS density scheme is based at least in part on whether the MTC downlink channel associated with the reference signal is a control channel or a data channel.

6. The method of claim 1, wherein communicating using the reference signal comprises:
    performing at least one of a channel estimation or an interference estimation using the reference signal; and
    decoding the MTC downlink channel associated with the reference signal based on the at least one of the channel estimation or the interference estimation.

7. An apparatus for wireless communication, comprising:
    a processor;
    memory in electronic communication with the processor; and
    instructions stored in the memory and executable by the processor to cause the apparatus to:
        indicate that the apparatus is operating according to a machine-type communication (MTC) device category;
        receive a reference signal (RS) density scheme indication in dedicated signaling sent in downlink control information (DCI);
        monitor for a reference signal associated with an MTC downlink channel and transmitted according to an RS density scheme based on the RS density scheme indication, the RS density scheme selected from a set of RS density schemes based at least in part on the MTC device category indicated by the apparatus and the MTC downlink channel associated with the reference signal;
        identify the RS density scheme based at least in part on the RS density scheme indication and the MTC downlink channel associated with the reference signal; and
        communicate using the reference signal according to the identified RS density scheme.

8. The apparatus of claim 7, wherein the instructions to monitor for a reference signal are executable by the processor to cause the apparatus to:
    receive at least one of a cell-specific reference signal (CRS) or a demodulation reference signal (DM-RS) or a combination thereof.

9. The apparatus of claim 7, wherein the instructions to identify the RS density scheme are based on one or more parameters associated with the MTC downlink channel associated with the reference signal.

10. The apparatus of claim 7, wherein the instructions to identify the RS density scheme are based at least in part on whether the MTC downlink channel associated with the reference signal is a broadcast channel or a unicast channel.

11. The apparatus of claim 7, wherein the instructions to identify the RS density scheme are based at least in part on whether the MTC downlink channel associated with the reference signal is a control channel or a data channel.

12. The apparatus of claim 7, wherein the instructions are executable by the processor to cause the apparatus to:
    perform at least one of a channel estimation or an interference estimation using the reference signal; and
    decode the MTC downlink channel associated with the reference signal based on at least one of the channel estimation or the interference estimation.

13. An apparatus for wireless communication, comprising:
    means for indicating that the apparatus is operating according to a machine-type communication (MTC) device category;
    means for receiving a reference signal (RS) density scheme indication in dedicated signaling sent in downlink control information (DCI);
    means for monitoring for a reference signal associated with an MTC downlink channel and transmitted according to an RS density scheme based on the RS density scheme indication, the RS density scheme selected from a set of RS density schemes based at least in part on the MTC device category indicated by the apparatus and the MTC downlink channel associated with the reference signal;

means for identifying the RS density scheme based at least in part on the RS density scheme indication and the MTC downlink channel associated with the reference signal; and means for communicating using the reference signal according to the identified RS density scheme.

14. The apparatus of claim 13, wherein the means for monitoring for a reference signal comprises:

means for receiving at least one of a cell-specific reference signal (CRS) or a demodulation reference signal (DM-RS) or a combination thereof.

15. The apparatus of claim 13, wherein the means for identifying the RS density scheme is operable based at least in part on whether the MTC downlink channel associated with the reference signal is a broadcast channel or a unicast channel.

16. The apparatus of claim 13, wherein the means for identifying the RS density scheme is operable based at least in part on whether the MTC downlink channel associated with the reference signal is a control channel or a data channel.

17. The apparatus of claim 13, wherein the means for communicating using the reference signal comprises:

means for performing a channel estimation using the reference signal; and means for transmitting an indication of the channel estimation to a serving base station.

18. A non-transitory computer-readable medium storing computer-executable code for wireless communication at a wireless device when executed by a processor, cause the processor to:

indicate, by the wireless device, that the wireless device is operating according to a machine-type communication (MTC) device category;

receive a reference signal (RS) density scheme indication in dedicated signaling sent in downlink control information (DCI);

monitor for a reference signal associated with an MTC downlink channel and transmitted according to an RS density scheme based on the RS density scheme indication, the RS density scheme selected from a set of RS density schemes based at least in part on the MTC device category indicated by the wireless device and the MTC downlink channel associated with the reference signal;

identify, by the wireless device, the RS density scheme based at least in part on the RS density scheme indication and the MTC downlink channel associated with the reference signal; and communicate using the reference signal according to the identified RS density scheme.

* * * * *